United States Patent
Shinjo et al.

[11] Patent Number: 5,641,427
[45] Date of Patent: Jun. 24, 1997

[54] LIQUID CRYSTAL COMPOSITION, LIQUID CRYSTAL DEVICE USING THE COMPOSITION LIQUID CRYSTAL APPARATUS AND DISPLAY METHOD

[75] Inventors: Kenji Shinjo, Atsugi; Hiroyuki Kitayama, Isehara; Koichi Sato, Atsugi, all of Japan

[73] Assignee: Canon Kabushiki Kaisha, Tokyo, Japan

[21] Appl. No.: 506,537

[22] Filed: Jul. 25, 1995

[30] Foreign Application Priority Data

Jul. 26, 1994 [JP] Japan .................. 6-192706
Jul. 26, 1994 [JP] Japan .................. 6-192707
Jul. 26, 1994 [JP] Japan .................. 6-192708
Jul. 26, 1994 [JP] Japan .................. 6-192709

[51] Int. Cl.$^6$ .................. C09K 19/52; C09K 19/34; C09K 19/32; C09K 19/20
[52] U.S. Cl. .................. 252/299.01; 252/299.61; 252/299.62; 252/299.66; 252/299.67; 252/299.63
[58] Field of Search .................. 252/299.61, 299.62, 252/299.67, 299.66, 299.63, 299.01

[56] References Cited

U.S. PATENT DOCUMENTS

| | | | |
|---|---|---|---|
| 4,367,924 | 1/1983 | Clark et al. | 359/56 X |
| 5,082,587 | 1/1992 | Janulis | 252/299.01 |
| 5,262,082 | 11/1993 | Janulis et al. | 252/299.01 |
| 5,417,883 | 5/1995 | Epstein et al. | 252/299.01 |

FOREIGN PATENT DOCUMENTS

| | | |
|---|---|---|
| 0360521 | 3/1990 | European Pat. Off. . |
| 0392432 | 10/1990 | European Pat. Off. . |
| 0625513 | 11/1994 | European Pat. Off. . |
| 56-107216 | 8/1981 | Japan . |
| 61-293288 | 12/1986 | Japan . |
| 62-093248 | 4/1987 | Japan . |
| 62-198633 | 9/1987 | Japan . |
| 63-022042 | 1/1988 | Japan . |
| 63-044551 | 2/1988 | Japan . |
| 63-088161 | 4/1988 | Japan . |
| 63-104949 | 5/1988 | Japan . |
| 63-107951 | 5/1988 | Japan . |
| 63-122651 | 5/1988 | Japan . |
| 63-192732 | 8/1988 | Japan . |
| 63-196553 | 8/1988 | Japan . |
| 63-196571 | 8/1988 | Japan . |
| 63-215661 | 9/1988 | Japan . |
| 63-216878 | 9/1988 | Japan . |
| 63-218647 | 9/1988 | Japan . |

(List continued on next page.)

OTHER PUBLICATIONS

D.Demus, H. Zaschke; Flüssige Kristalle in Tabellen II,1984 (VEB Deutscher Verlag für Grundstoffindustrie).
A.D.L. Chandani et al. J. Journal Appl. Phys.v27(5), L729–732, May 1988.
M. Schadt & W. Helfrich, Appl. Phys. Lett.v18(4), 15 Feb. 1971 pp. 127–128.
Fukuda et al., "Structures and Properties of Ferroelectric Liquid Crystals" (1990), Corona Publishing Co. Ltd., Tokyo, Japan. (pp. 344–349).
A. Fukuda, Future Liquid Crystal Display and its Materials (1992) K. K. CMC, Tokyo, Japan (pp. 36–51).

Primary Examiner—C. H. Kelly
Attorney, Agent, or Firm—Fitzpatrick, Cella, Harper & Scinto

[57] ABSTRACT

A liquid crystal composition includes at least one fluorine-containing mesomorphic compound (a) having a fluorocarbon terminal portion and a hydrocarbon terminal portion, and at least one optically active compound (b) having at least one substituted or unsubstituted terminal alkyl group containing an asymmetric carbon atom directly connected with F, $CF_3$ or $CH_3$. The liquid crystal composition shows a layer structure of so-called bookshelf or a layer structure having a small inclination angle (closer to bookshelf structure). The liquid crystal composition is useful in improving response characteristics and display characteristics, particularly a contrast ratio, of a liquid crystal device using the liquid crystal composition.

25 Claims, 4 Drawing Sheets

FOREIGN PATENT DOCUMENTS

| | | |
|---|---|---|
| 63-225337 | 9/1988 | Japan . |
| 63-243059 | 10/1988 | Japan . |
| 63-303951 | 12/1988 | Japan . |
| 01022990 | 1/1989 | Japan . |
| 01031740 | 2/1989 | Japan . |
| 01038077 | 2/1989 | Japan . |
| 01121244 | 5/1989 | Japan . |
| 01160986 | 6/1989 | Japan . |
| 01207280 | 8/1989 | Japan . |
| 01242543 | 9/1989 | Japan . |
| 01265052 | 10/1989 | Japan . |
| 01272571 | 10/1989 | Japan . |
| 02000127 | 1/1990 | Japan . |
| 02000227 | 1/1990 | Japan . |
| 02028158 | 1/1990 | Japan . |
| 02069427 | 3/1990 | Japan . |
| 02069440 | 3/1990 | Japan . |
| 02069467 | 3/1990 | Japan . |
| 02115145 | 4/1990 | Japan . |
| 02295943 | 12/1990 | Japan . |
| 03043488 | 2/1991 | Japan . |
| 03058980 | 3/1991 | Japan . |
| 03083971 | 4/1991 | Japan . |
| 03193774 | 8/1991 | Japan . |
| 03223232 | 10/1991 | Japan . |
| 03227980 | 10/1991 | Japan . |
| 03236353 | 10/1991 | Japan . |
| 04013797 | 1/1992 | Japan . |
| 4-26679 | 1/1992 | Japan . |
| 04253789 | 9/1992 | Japan . |
| 04264052 | 9/1992 | Japan . |
| 04300871 | 10/1992 | Japan . |
| 06234749 | 8/1994 | Japan . |
| 2269817 | 2/1994 | United Kingdom . |
| WO 22396 | 11/1993 | WIPO . |
| WO93022396 | 11/1993 | WIPO . |

LIQUID CRYSTAL COMPOSITION, LIQUID CRYSTAL DEVICE USING THE COMPOSITION LIQUID CRYSTAL APPARATUS AND DISPLAY METHOD

FIELD OF THE INVENTION AND RELATED ART

The present invention relates to a liquid crystal composition, particularly a chiral smectic liquid crystal composition, and a liquid crystal device using the liquid crystal composition suitable for use in flat-panel displays, projection displays, etc. The present invention also relates to a liquid crystal apparatus using the device particularly as a display device, and a display method using the composition.

There has been known a cathode ray tube (CRT) as a display device. The CRT has widely been used as a display terminal for outputting motion pictures of a television receiver or a video tape recording (VTR) apparatus or used as a monitor for a personal computer. However, the CRT encounters problems when outputs still images, in view of its characteristics, such that visibility or observability is liable to be lowered by, e.g., scanning fringe due to flicker or insufficient resolution and that degradation or deterioration of a fluorescent substance due to a surface memory is caused to occur in some cases. In recent years, it has been found that an electromagnetic wave generated by the CRT adversely affects the human body. As a result, the CRT can break the health of video display terminal (VDT) operators in some cases. In addition, the CRT has a structure including a large volume behind a picture area (display portion), whereby space-saving utilization of an office or a house in which the CRT is used is hindered.

Liquid crystal devices have been used as a display device having solved the above-mentioned problems of the CRT. For instance, there have been known liquid crystal devices using use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

One of the above-mentioned TN-type liquid crystal devices is a simple matrix-type liquid crystal device having the advantage of inexpensive production costs. When the liquid crystal device is driven by using an electrode matrix structure with an improved pixel density in accordance with a multiplex driving scheme, the liquid crystal device is liable to encounter a problem of occurrence of crosstalk, so that the number of pixels is restricted. Further, the uses of the device as a display device is also limited since the response speed is too slow, i.e., on the order of at least several ten milliseconds.

In recent years, there have been proposed liquid crystal devices using a thin film transistor (TFT). These liquid crystal devices can control a display state pixel by pixel since each pixel is provided with a transistor, whereby the devices solve problems of crosstalk and response speed. However, as these devices have a larger picture area, it is industrially more difficult to prepare a liquid crystal device with no defective pixels. Even if it is possible to prepare such a liquid crystal device, the device is more expensive.

To overcome the above-mentioned drawbacks of such conventional liquid crystal devices, the use of liquid crystal devices using a liquid crystal material having bistability has been proposed by Clark and Lagerwall (e.g. Japanese Laid-Open Patent Appln. (JP-A) No. 56-107216; U.S. Pat. No. 4,367,924, etc.) In this instance, as the liquid crystal material having bistability, a ferroelectric liquid crystal having chiral smectic C-phase (SmC*) or H-phase (SmH*) is generally used. The ferroelectric liquid crystal can effect inversion switching due to its spontaneous polarization, thus showing a very high response speed. Further, the ferroelectric liquid crystal shows bistable states (bistability) having a memory characteristic and is excellent in view angle characteristics, so that a liquid crystal device using a ferroelectric liquid crystal is considered suitable for a display device or light-valve having properties including high-speed responsiveness, high resolution and a large picture area. In recent years, there has been proposed an anti-ferroelectric chiral smectic liquid crystal device using three stable states, as described in "Japanese Journal of Applied Physics" vol. 27, p. L729 (1988) by Chanani and Takezoe et al.

Such a liquid crystal device using a chiral smectic liquid crystal, however, encounters a problem such that a contrast ratio is lowered by occurrence of a zig-zag alignment defect in some cases, as described in "Structures and Properties of Ferroelectric Liquid Crystals" (1990) by Atsuo Fukuda and Hideo Takezoe issued by Corona Publishing Co. Ltd. (Tokyo Japan). The reason why the zigzag defect occurs may be attributable to the fact that a layer of a chiral smectic liquid crystal disposed between a pair of substrates constituting a cell structure includes two kinds of chevron layer structures.

On the other hand there has been the recent trend in layer structure of a (chiral smectic) liquid crystal wherein a high contrast ratio is intended to be realized by suppressing a chevron layer structure resulting in a low contrast ratio and providing the liquid crystal with a bookshelf layer structure (hereinafter referred to as "bookshelf structure") in which boundaries of each liquid crystal molecular layer are disposed in parallel with each other (i.e., like a bookshelf) or with a structure closer to the bookshelf structure (e.g., Atsuo Fukuda (Editor)) Future Liquid Crystal Display and Its Materials (Zisedai Ekisho Display To Ekisho Zairyo)" (1992), issued by K.K. CMC (Tokyo Japan). One of methods for realizing a bookshelf structure is a method of using a naphthalene-based liquid crystal material having a particular structure. In this method, however, the resultant liquid crystal device has a tilt angle of about 10 degrees, which is considerably smaller than an ideal tilt angle of 22.5 degrees providing a maximum transmittance, thus resulting in a low transmittance or a low contrast. In addition, such a liquid crystal material fails to exhibit a bookshelf structure reversibly with respect to temperature in many cases. Another method for giving a bookshelf structure may include one inducing a bookshelf structure by externally applying an electric field to a liquid crystal device. Such a method, however, involves a problem of unstability against external stimuli such as temperature. In addition, various other problems are presumably present in order to put a liquid crystal material exhibiting a bookshelf structure into practical use since such a material has just discovered or proposed.

Further, in quite recent years, there have been proposed a mesomorphic (liquid crystal) compound having a perfluoroether terminal portion (U.S. Pat. No. 5,262,082 and International Publication No. WO93/22396) or having a perfluoroalkyl terminal portion (U.S. Pat. No. 5,082,587) and a chiral smectic liquid crystal composition (Marc D. Radcliffe et al. The 4th International Ferroelectric Liquid Crystal Conference, P-46 (1993)) as materials exhibiting a bookshelf structure or a structure closer thereto. By using these liquid crystal materials, it is possible to provide a bookshelf structure or a structure showing a small layer inclination angle and being closer to the bookshelf structure without using external fields such as an external electric field. These liquid crystal materials also provide a larger tilt angle.

However, these liquid crystal materials (compounds and compositions) are liable to exhibit poor solubility with other many mesomorphic (liquid crystal) compounds due to its particular denser molecular structure and provide an insufficient response speed attributable to a larger tilt angle in some cases.

Accordingly, there have been desired to provide a chiral smectic (or ferroelectric) liquid crystal composition suitable for a liquid crystal device showing good switching (driving) characteristics by selecting such a chiral smectic liquid crystal composition as to comprise a mesomorphic (liquid crystal) compound exhibit a bookshelf structure of a liquid crystal layer or a structure having a layer inclination angle closer thereto and comprise a chiral dopant (chiral doping substance) having a sufficient solubility with the mesomorphic compound and inducing a large spontaneous polarization in combination.

SUMMARY OF THE INVENTION

An object of the present invention is to provide a liquid crystal composition, particularly a chiral smectic liquid crystal composition showing a good alignment state and stably exhibiting a bookshelf structure or a structure, having a small layer inclination angle, closer to the bookshelf structure with respect to a liquid crystal layer structure, thereby to realize a liquid crystal device having improved properties such as high responsiveness, high contrast, high definition and high brightness.

Another object of the present invention is to provide a liquid crystal composition having an excellent mutual solubility between components thereof to stably exhibit the above required characteristics.

Another object of the present invention is to provide a large-area liquid crystal device having the above-mentioned improved properties by using the above liquid crystal composition, a liquid crystal apparatus particularly a liquid crystal display apparatus showing excellent display characteristics by using the above liquid crystal device, and a display method using the above liquid crystal composition or the liquid crystal device.

According to the present invention, there is provided a liquid crystal composition, comprising:

at least one fluorine-containing mesomorphic compound (a) comprising a fluorocarbon terminal portion and a hydrocarbon terminal portion, the terminal portions being connected by a central core, the compound (a) having smectic phase or having latent smectic phase; and at least one optically active compound (b) represented by the following formula (II):

$$R_O\text{—}A_O\text{—}R_1 \qquad (II),$$

wherein $A_O$ is a mesogen group comprising one to four divalent groups each connected directly or by a bonding group and each capable of having one or two substituents comprising F, Cl, Br, $CH_3$, $CF_3$ and/or CN, the divalent group being selected from the group consisting of 1,4-phenylene; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; and 2-alkylcoumaran-2,5-diyl having a linear or branched alkyl group having 1–18 carbon atoms; and $R_0$ and $R_1$ independently denote a substituted or unsubstituted linear or branched alkyl group having 1–18; each of the alkyl groups $R_0$ and $R_1$ being capable of including at least one —$CH_2$— group which can be replaced by —Y—, —Y—CO—, —CO—Y—, —CO—, —OCOO—, —CH=CH— or —C≡C— in which Y is O or S; and at least one of $R_0$ and $R_1$ having at least one asymmetric carbon atom directly connected with F, $CF_3$ or $CH_3$.

The present invention provides a liquid crystal device comprising a pair of opposite electrode plates and the liquid crystal composition described above disposed between the electrode plates.

The present invention further provides a liquid crystal apparatus including the liquid crystal device, particularly including a display panel comprising the liquid crystal device.

The present invention still further provides a display method using the liquid crystal composition described above and controlling the alignment direction of liquid crystal molecules in accordance with image data to effect display.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
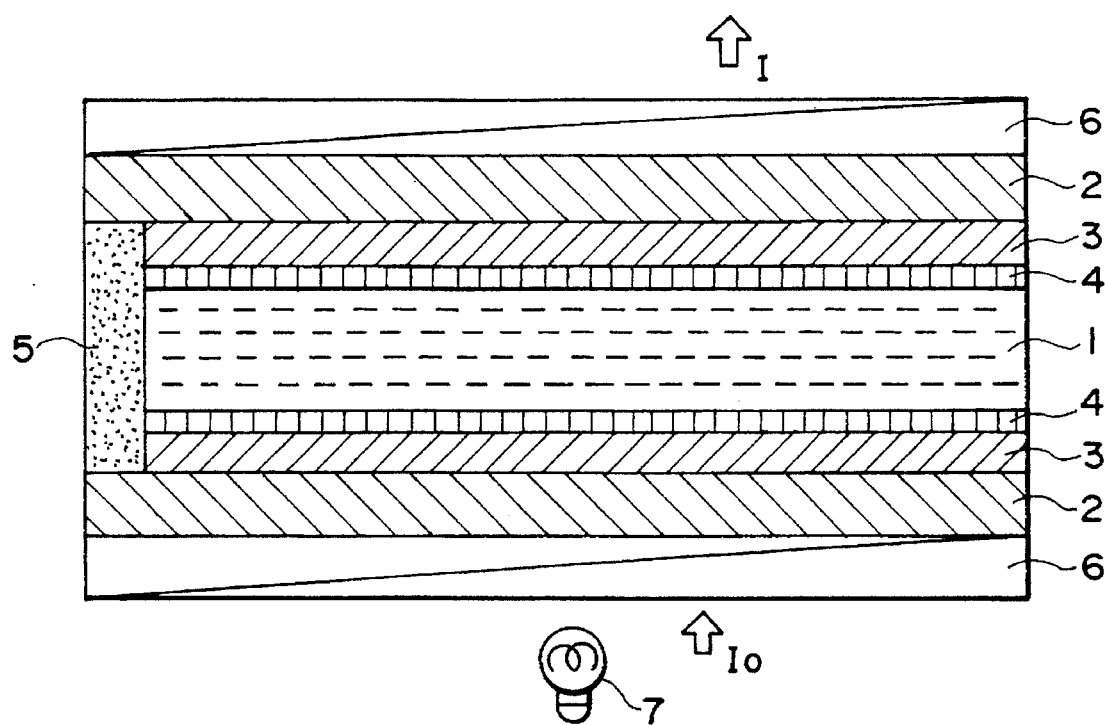
FIG. 1 is a schematic sectional view of a liquid crystal device using a liquid crystal composition according to the present invention.

The liquid crystal composition according to the present invention is characterized by using the fluorine-containing mesomorphic compound (a) and the optically active (or chiral) compound (b) respectively described above in combination.

The liquid crystal composition of the present invention has a good homogeneity (or uniformity) due to an excellent mutual solubility between the compound (a) and the compound (b). The liquid crystal composition may preferably be a chiral smectic liquid crystal composition and more preferably be a ferroelectric liquid crystal composition. When the liquid crystal composition of the present invention is used in a liquid crystal device, a liquid crystal layer can exhibit a bookshelf structure or a structure closer thereto having a small layer inclination angle (hereinbelow, sometimes inclusively referred to a "bookshelf structure"), particularly attributable to the compound (a), without using, e.g., an external electric field, thus realizing a good alignment state and high-speed responsiveness.

The compound (a) used in the liquid crystal composition of the invention contains a fluorocarbon terminal portion, preferably a terminal perfluoroalkyl group or a terminal perfluoroether group. The compound (a) has a smectic phase (or mesophase) or a latent smectic phase (or mesophase). Herein, the compound (a) having a latent smectic phase means a compound not showing a smectic phase by itself but showing a smectic phase when used together with a compound having a smectic phase or another compound having a latent smectic phase.

On the other hand, the compound (b) used in combination with the compound (a) described above is useful in providing a resultant liquid crystal composition with a chiral smectic phase, i.e., is used as a chiral doping substance or a chiral dopant. As a result, the resultant liquid crystal composition provides a high response speed and stably shows a bookshelf structure while ensuring a mutual solubility between the respective components.

Hereinbelow, the fluorine-containing mesomorphic compound (a) will be explained more specifically.

The term "mesomorphic compound" used herein covers not only a compound assuming a mesomorphic (liquid crystal) phase but also a compound not assuming a mesomorphic phase per se as long as a liquid crystal composition containing such a compound assumes a mesomorphic phase.

The mesomorphic compound (a) used in the liquid crystal composition of the invention may preferably have a fluorocarbon terminal portion of the compound (a) is $-DC_xF_{2x+1}$ or $-D(C_{x'}F_{2x'}O)_zC_yF_{2y+1}$ in which x is 1-20;

x' is independently 1-10 for each $C_{x'}F_{2x'}O$ group;

y is 1-10;

z is 1-10; and

D is a single bond, $-(CH_2)_r-$, $-COO-C_rH_{2r}-$, $-OC_rH_{2r}-$, $-OC_rH_{2r}O-C_{r'}H_{2r'}-$, $-OSO_2-$, $-SO_2-$, $-SO_2-C_rH_{2r}-$, $-C_rH_{2r}-N(C_pH_{2p+1})-SO_2-$, or $-C_rH_{2r}-N(C_pH_{2p+1})-CO-$ wherein r and r' are independently 1-20, and p is 0-4.

The mesomorphic compound (a) may more preferably have a fluorocarbon terminal portion of $-D(C_{x'}F_{2x'}O)_z C_yF_{2y+1}$ (perfluoroether group) in view of ease of providing a bookshelf structure.

The mesomorphic compound (a) may preferably be represented by the following formula (I):

$$A_1(B_1)_a M_1 (D_1)_b N_1 (F_1)_c G_1-R, \quad (I)$$
$$\quad\quad\quad |X_l \quad\quad |Y_m \quad\quad |Z_n$$

in which $B_1$, $D_1$ and $F_1$ independently denote

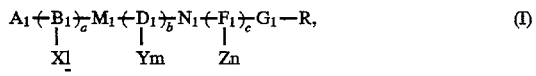

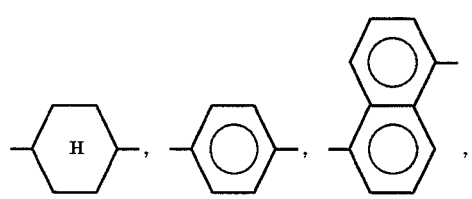

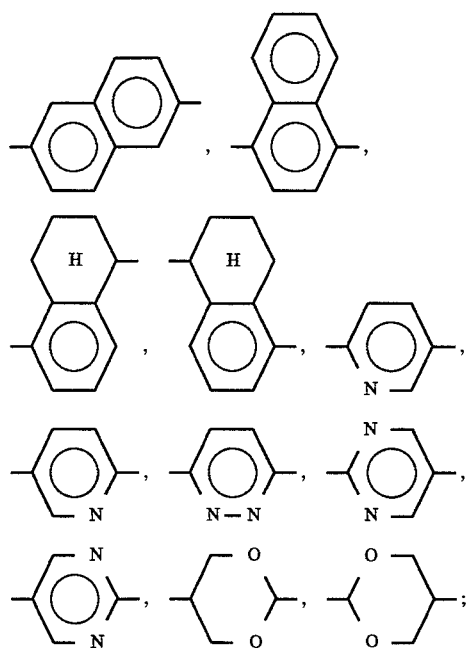

a, b and c independently denote an integer of 0–3 with the proviso that a+b+c is at least 2;

$M_1$ and $N_1$ independently denote $-COO-$, $-OCO-$, $-COS-$, $-SCO-$, $-COSe-$, $-SeCO-$, $-COTe-$, $-TeCO-$, $-(CH_2CH_2)_d$ wherein d is an integer of 1-4, $-CH=CH-$, $-CH=N-$, $-N=CH-$, $-CH_2O-$, $-OCH_2-$, $-CO-$, $-O-$ or a single bond;

X, Y and Z independently denote $-H$, $-Cl$, $-F$, $-Br$, $-I$, $-OH$, $-OCH_3$, $-CN$, or $-NO_2$ and l, m and n independently denote an integer of 0–4;

$G_1$ is $-COO-C_eH_{2e}-$, $-O-C_eH_{2e}-$, $-C_eH_{2e}-$, $-OSOO-$, $-OOSO-$, $-SOO-$, $-SOOC_eH_{2e}-$, $-OC_eH_{2e}-OC_{e'}H_{2e'}-$, $-C_eH_{2e}-N(C_pH_{2p+1})-SO_2-$ or $-C_eH_{2e}-N(C_pH_{2p+1})-CO-$ wherein e and e' independently denote an integer of 1–20 and p is an integer of 0–4;

$A_1$ is a linear or branched group represented by $-O-C_fH_{2f}-O-C_gH_{2g+1}$, $-C_fH_{2f}-O-C_gH_{2g+1}$, $-C_fH_{2f}-R'$, $-O-C_fH_{2f}-R'$, $-COO-C_fH_{2f}-R'$ or $-OCO-C_fH_{2f}-R'$ wherein R' is $-Cl$, $-F$, $-CF_3$, $-NO_2$, $-CN$, $-H$, $-COO-C_fH_{2f+1}$ or $-OCO-C_fH_{2f+1}$ in which and f, f' and g independently denote an integer of 1–20; and R is $-C_xF_{2x+1}$ or $-(C_{x'}F_{2x'})_zC_yF_{2y+1}$ wherein x is an integer of 1–20, x' is independently an integer of 1–10 for each $C_{x'}F_{2x'}O$ group, y is an integer of 1–10, and z is an integer of 1–6.

R in the formula (I) may preferably be $(C_{x'}F_{2x'}O)_z$ $C_yF_{2y+1}$ (perfluoroether group) since the group is more effective in providing bookshelf structure.

The mesomorphic compound (a) (preferably having the formula (I)) may be synthesized through processes similar to those described in U.S. Pat. Nos. 5,082,587 and 5,262,082 and WO93/22936. Examples of the mesomorphic compound (a) of the formula (I) may include those shown below.

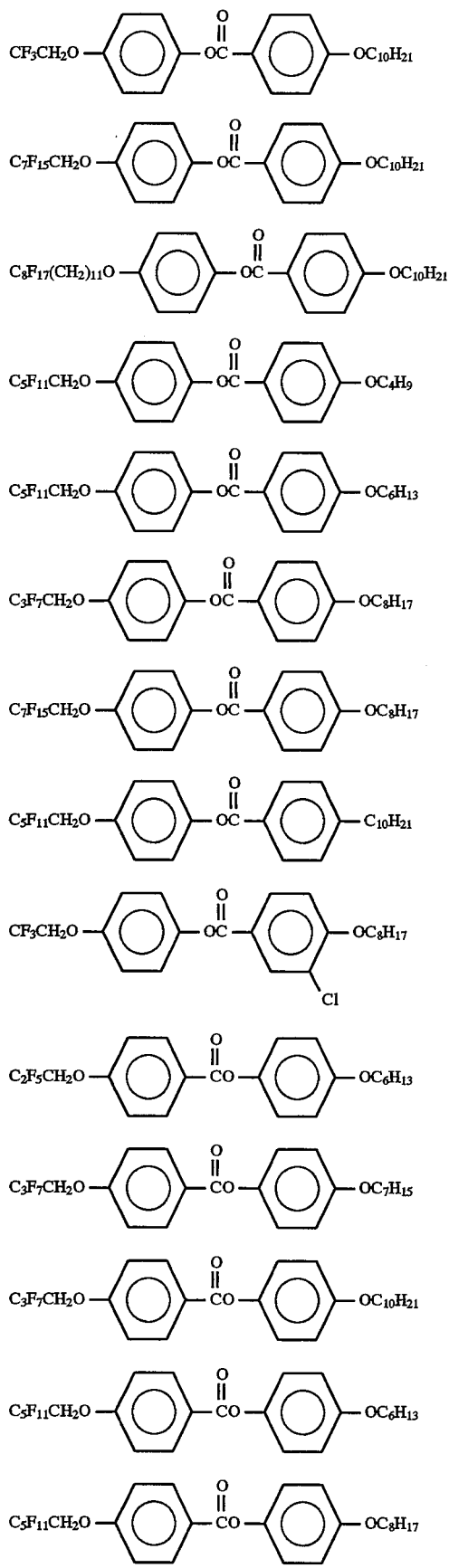
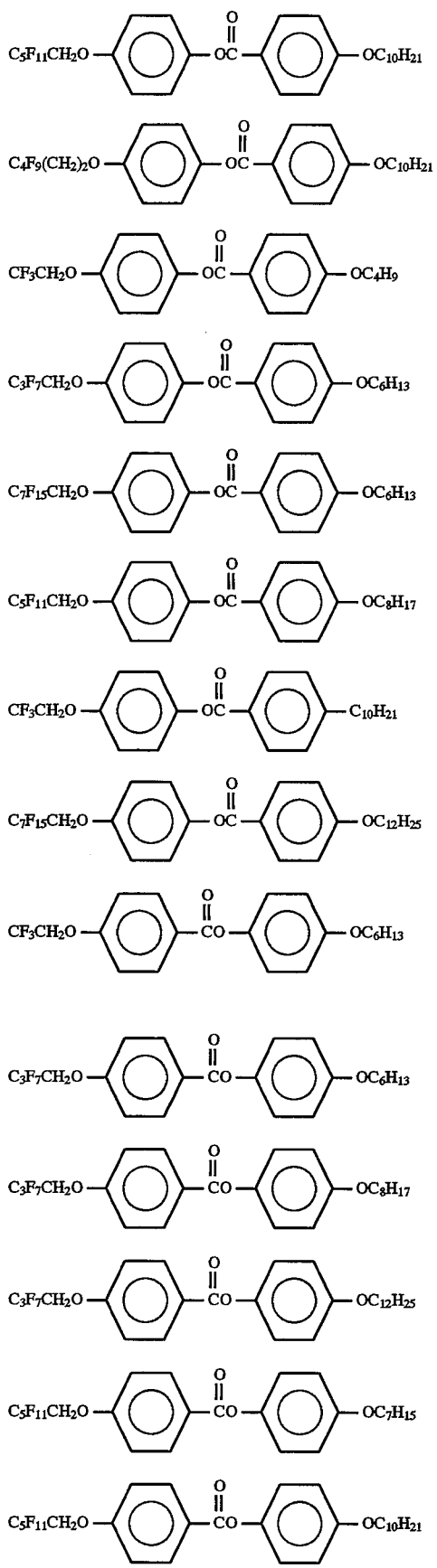

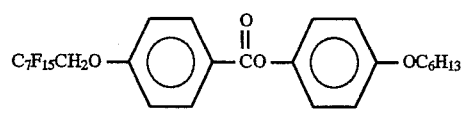
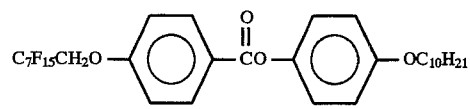
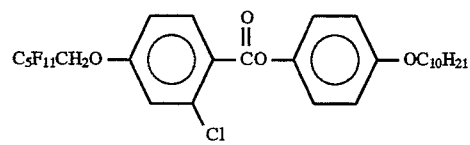
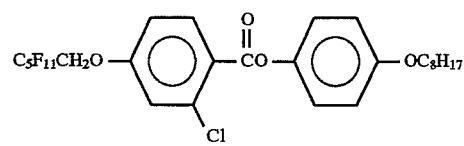
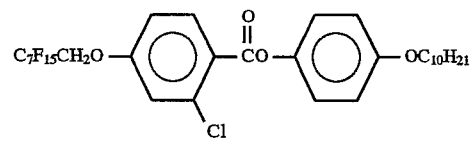
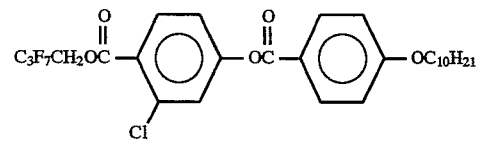
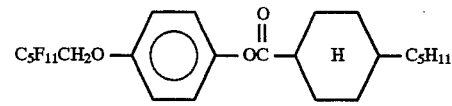
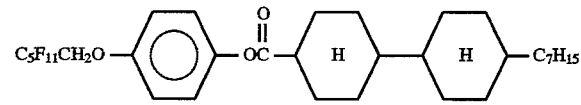
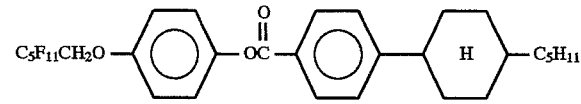
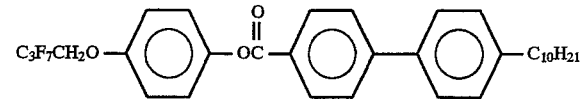
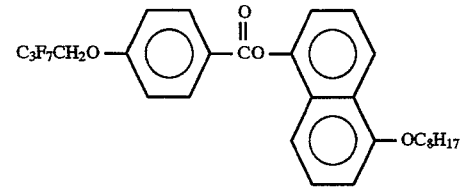
-continued
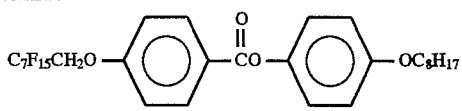
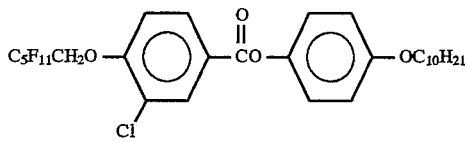
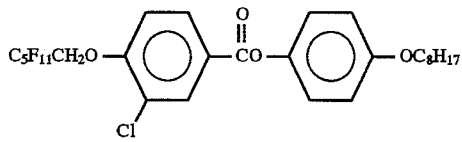
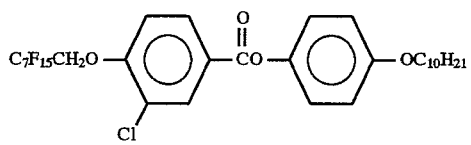
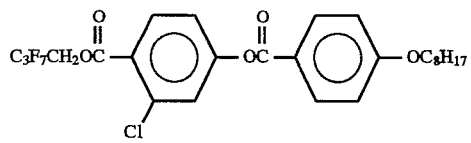
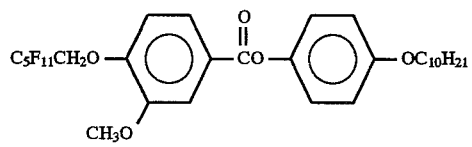
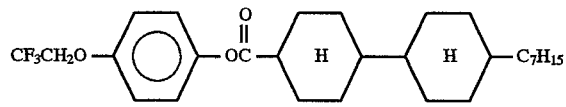

-continued
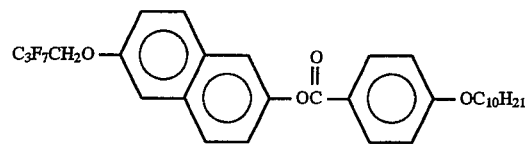
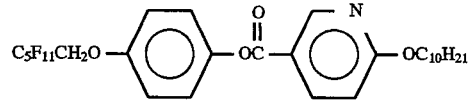
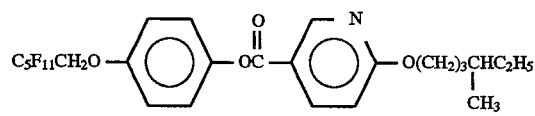
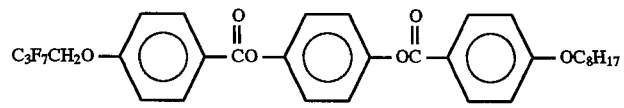
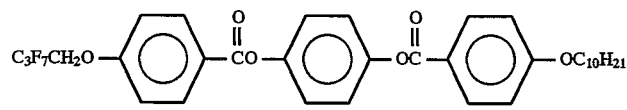
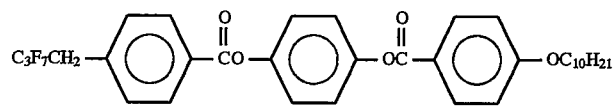
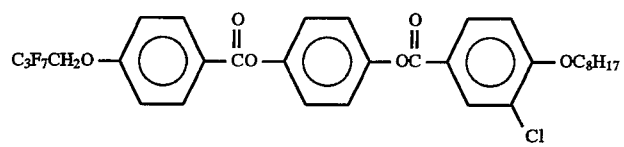
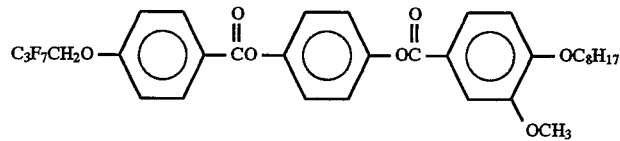
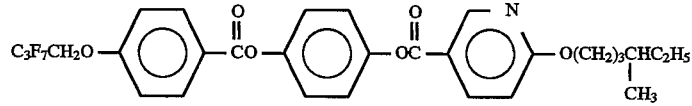
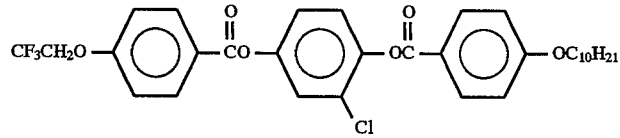
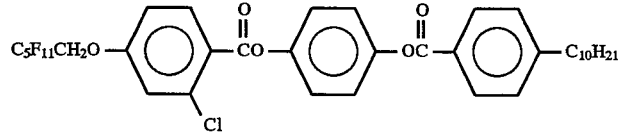
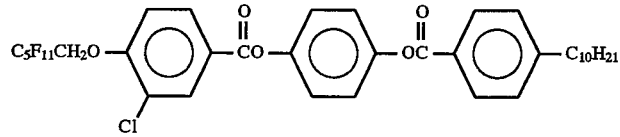
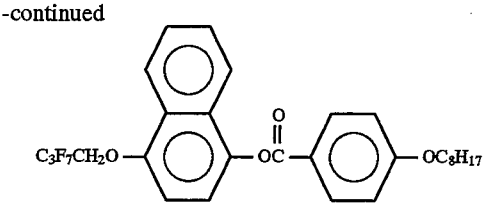
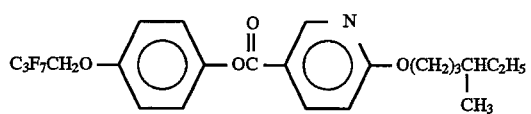

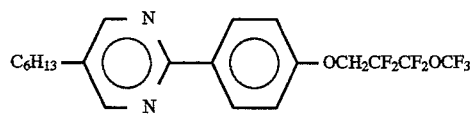
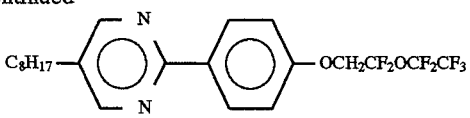
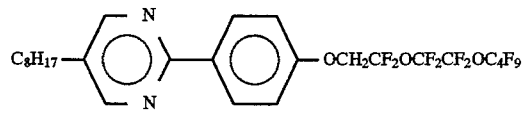
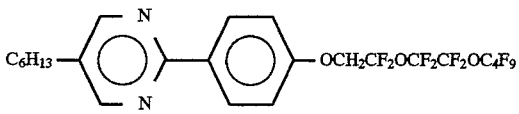
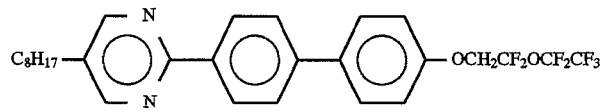
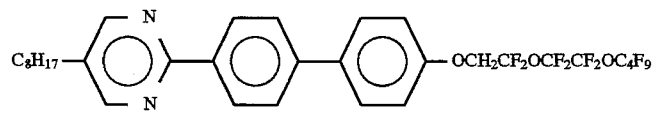
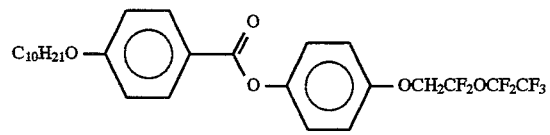
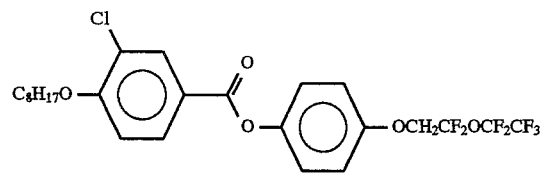
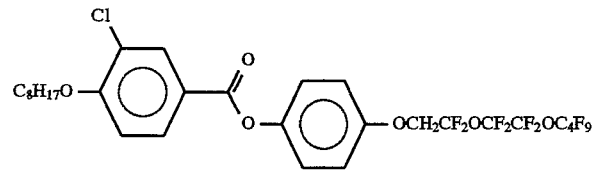
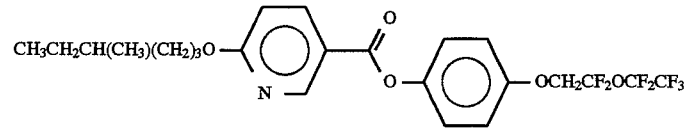
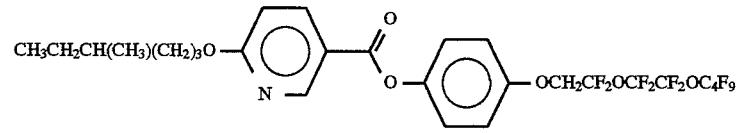
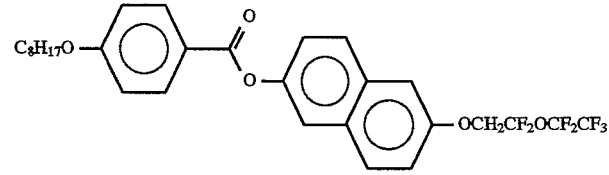
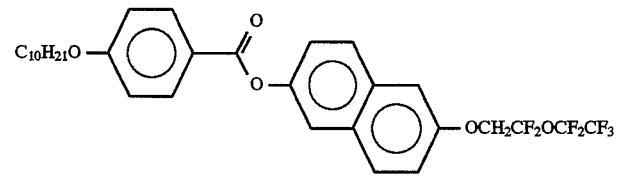

-continued
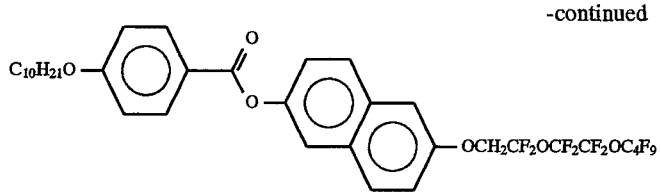
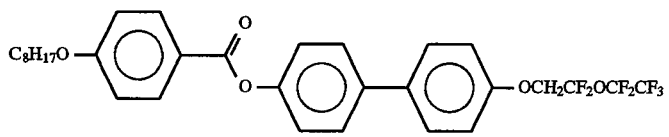
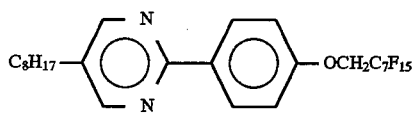
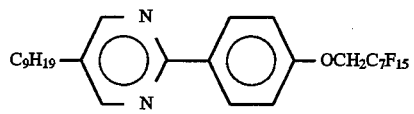
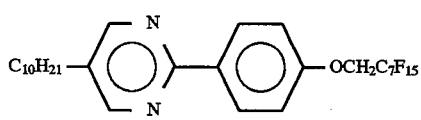
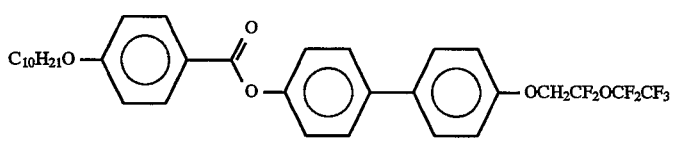
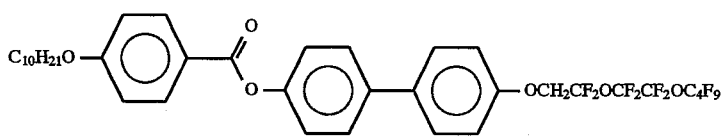
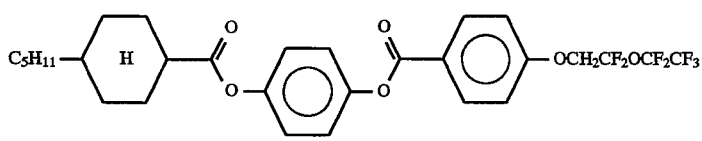
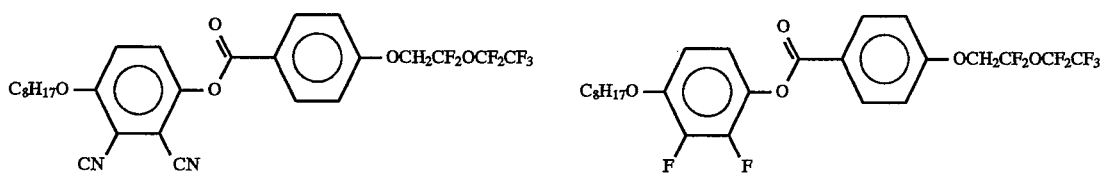
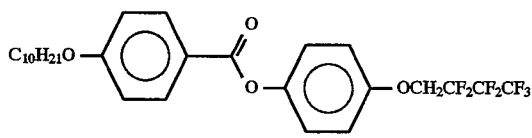
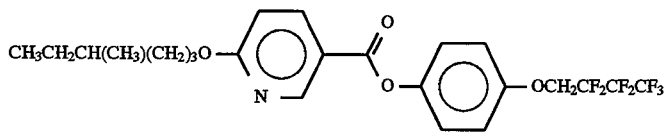
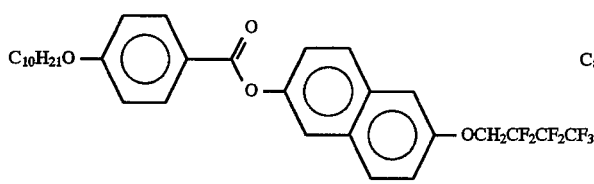
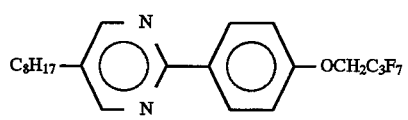

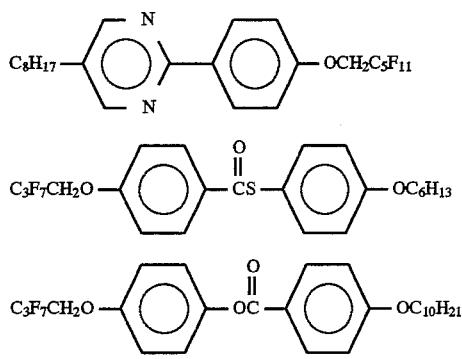
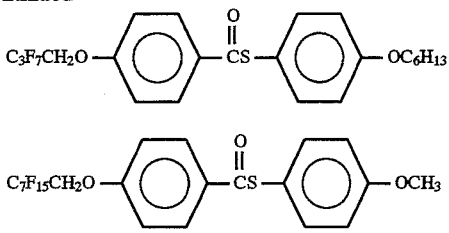
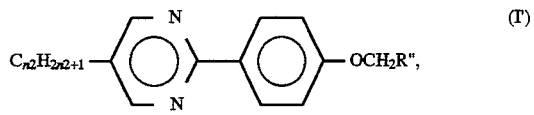

-continued

Among the mesomorphic compounds of the formula (I) as described above, a fluorine-containing mesomorphic compound having a phenyl-pyrimidine skeleton and represented by the formula (I') shown below may particularly preferably be used since the compound of the formula (I') is effective in providing a resultant liquid crystal composition with a chiral smectic C phase in a wide temperature range including room temperature and with a low viscosity.

Formula (I')

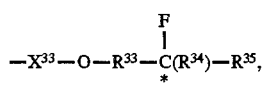

in which n2 is an integer of 5–10; and

R" is —$C_xF_{2x+1}$ or $(C_{x''}F_{2x''}O)_{z''}C_yF_{2y'+1}$ wherein x is an integer of 1–20, x" is independently an integer of 1—3 for each $C_{x''}F_{2x''}O$ group, y' is an integer of 1–4, and z" is an integer of 1–3.

By using the mesomorphic compound (a) (preferably having the formulae (I) and (I')), it is possible to provide a liquid crystal composition containing such a compound (a) with a bookshelf structure or a structure having a small layer inclination angle closer to that of the bookshelf structure without using an external electric field. The liquid crystal composition shows a high response speed due to its low viscosity and provides a larger pretilt angle to a liquid crystal device, whereby it is possible to realize a chiral smectic liquid crystal device showing a high transmittance.

The liquid crystal composition according to the present invention may preferably contain at least 30 wt. %, more preferably at least 50 wt. %, of at least one species of a fluorine-containing mesomorphic compound (a) preferably represented by the formula (I) or (I') in order to have the effects of addition thereof as described above, such as ease of providing a bookshelf structure, a large tilt angle and a low viscosity.

In the present invention, as described above, the liquid crystal composition may preferably contain the compound (a) having a perfluoroether group as a fluorocarbon terminal portion so as to provide a liquid crystal layer structure having a very small layer inclination angle closer to a bookshelf structure by which a good display characteristic (e.g., high contrast) is attained. The compound (a) may more preferably have a fluorocarbon terminal portion represented by —$D(C_{x'}F_{2x'}O)_zC_yF_{2y+1}$ (x', y and z are the same as mentioned above) and may particularly preferably have the above-mentioned formula (I) and the terminal group R represented by —$(C_{x'}F_{2x'}O)_zC_yF_{2y+1}$ (x', y and z' are the same as described above). In case where the compounds (a) having the above perfluoroether group are used, such compounds (a) may preferably be contained in the resultant liquid crystal composition in an amount of at least 30 wt. %, particularly at least 50 wt. %. Below 30 wt. %, a layer inclination angle of the resultant liquid crystal composition becomes too large, thus resulting in a poor display characteristic, such as a low contrast. On the other hand, even in the case of using the compound (a) in an amount of at least 30 wt. %, an alignment characteristic is lowered when compared with the case of using the compound (a) in an amount below 30 wt. % in some cases. In the present invention, however, such a disadvantage can be remedied by using a specific optically active compound (b) (as a chiral doping substance) as mentioned above in combination, whereby a bookshelf structure (or a closer structure thereto) can be provided stably to allow a uniform alignment state.

Hereinbelow, the optically active compound (b) Of the formula (II) used together with the mesomorphic compound (a) will be explained in detail.

The optically active compound (b) may be a mesomorphic compound, and the compound (b) is used as a chiral dopant and has at least one symmetric carbon atom directly connected with F, $CF_3$ or $CH_3$ as mentioned above. Such a chiral dopant (the compound (b)) having the particular asymmetric carbon atom has a good solubility with the above-mentioned mesomorphic compound (a), particularly those of the formulae (I) and (I'), having a terminal perfluoroalkyl group or a terminal perfluoroether group and has a prescribed spontaneous polarization-imparting property. As a result, a resultant (chiral smectic) liquid crystal composition according to the present invention provides good driving characteristics including a high contrast ratio and an excellent switching characteristic based on the formation of a bookshelf structure of a structure closer thereto having a small layer inclination angle.

In the formula (II) representing the compound (b), either one or both of $R_0$ and $R_1$ may preferably be represented by any one of the following formulae:

$$-X^{33}-O-R^{33}-\underset{*}{C}(R^{34})-R^{35},$$

in which $R^{35}$ is a linear or branched alkyl group having 1–18 carbon atoms; $R^{33}$ is —$CH_2$— or —CO—; $R^{34}$ is H or $CH_3$; $X^{33}$ is a single bond or —$CH_2$— when $R^{33}$ is —CO—, or $X^{33}$ is a single bond, —CO— or —$CH_2$— when $R^{33}$ is —$CH_2$—; and C* is an asymmetric carbon atom $$-X^{43}-\overset{CF_3}{\underset{*}{CH}}-R^{43},$$

in which $R^{43}$ is a linear or branched alkyl group having 1–10 carbon atoms; $X^{43}$ is —O—, —COO—, —OCH$_2$—, —OCH$_2$CH$_2$—, —OCOCH$_2$—, —CH$_2$O—, —COOCH$_2$CH$_2$—, —CH$_2$OCH$_2$CH$_2$— or —CH$_2$COOCH$_2$—; and C* is an asymmetric carbon atom; and $$-X^{53}-O(-CO)_{\overline{L52}}\overset{CH_3}{\underset{*}{CH}}(-X^{54})_{\overline{L53}}R^{53}$$

in which $R^{53}$ is a linear or branched alkyl group having 1–18 carbon atoms; L52 is 0 or 1; $X^{53}$ is a single bond, —CO— or —CH$_2$— when L52 is 0, or $X^{53}$ is a single bond or —CH$_2$— when L52 is 1; $X^{54}$ is —COO—, or —O—; L53 is 0 or 1; and C* is an asymmetric carbon atom.

Such groups $R_0$ and $R_1$ is particularly effective in imparting a large spontaneous polarization to the resultant liquid crystal composition.

In the formula (II) representing the optically active compound (b), both of $R_0$ and $R_1$ may be an alkyl group having an asymmetric carbon atom directly connected with F, CF$_3$ or CH$_3$.

The optically active compound (b) represented by the formula (II) used in the present invention may preferably include at least one species of an optically active compound represented by any one of the following formulae (III), (IV), (V) and (VI).

Compound (b) of the formula (III)

$$R^{32}-(A^{32}-X^{32})_{m32}-A^{33}-A^{34}-X^{33}-O-R^{33}-\overset{F}{\underset{*}{C(R^{34})}}-R^{35}, \quad (III)$$

in which
$R^{32}$ is a linear or branched alkyl group having 1–18 carbon atoms capable of including at least one —CH$_2$— group which can be replaced by —Y$^3$—, —Y$^3$—CO—, —CO—Y$^3$—, —CO—, —OCOO—, —CH=CH— or —C≡C— wherein Y$^3$ is O or S;

$R^{35}$ is a linear or branched alkyl group having 1–18 carbon atoms;

m32 is 0, 1 or 2;

$R^{33}$ is —CH$_2$— or —CO—;

$R^{34}$ is H or CH$_3$;

$A^{32}$, $A^{33}$ and $A^{34}$ independently denote a single bond, 1,4-phenylene; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$X^{32}$ is a single bond, —COO—, —OCO—, —CH$_2$O— or —OCH$_2$—;

$X^{33}$ is a single bond or —CH$_2$—when $R^{33}$ is —CO—, or $X^{33}$ is a single bond, —CO— or —CH$_2$—when $R^{33}$ is —CH$_2$—;

C* is an asymmetric carbon atom; and $A^{32}$, $A^{33}$ and $A^{34}$ each may have one or two substituents comprising F, Cl, Br, CH$_3$, CF$_3$ and/or CN.

Examples of the compound (b) of the formula (III) may include those as described in JP-A Nos. 62-093248, 62-198633, 63-088161, 63-104949, 63-107951, 63-122651, 63-022042, 63-192732, 63-196553, 63-196571, 63-215661, 63-216878, 63-218647, 63-225337, 63-243059, 63-303951, 64-022990, 1-272571, 64-031740, 1-121244, 1-207280, 1-038077, 1-265052, 2-028158, 2-069427, 2-069467, 2-115145, 2-000227, 3-227980 and 4-300871. The compound (b) of the formula (III) may be produced through processes as described in these documents.

Specific and preferred examples of the optically active compound (b) of the formula (III) may include those represented by the following structural formulae (Ex. Comp. Nos. 3–1 to 3–105 indicated as Nos. 1–105 in Table 1 below) including abbreviations used for the respective groups listed below (hereinbelow, the abbreviations in Tables 2–6 represent the same groups as those in Table 1). In Table 1, the structural formula (Ex. Comp. No. 3-64 indicated as No. 64) has m32 being 2.

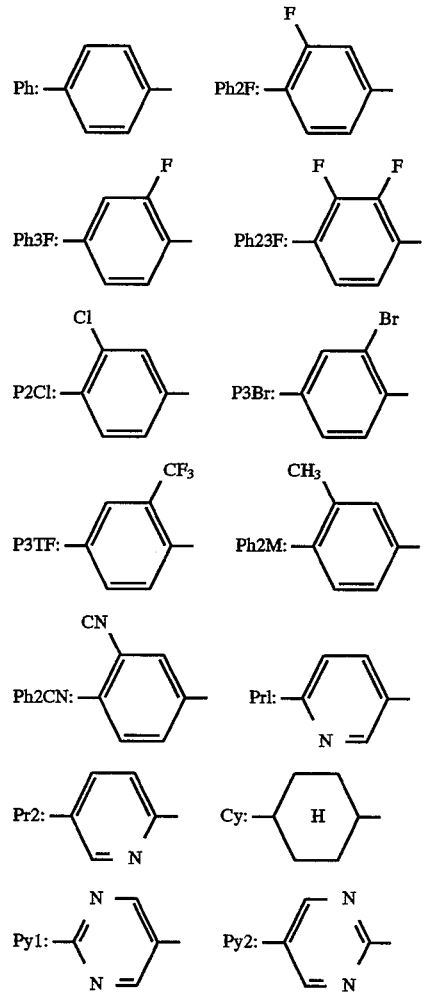

-continued

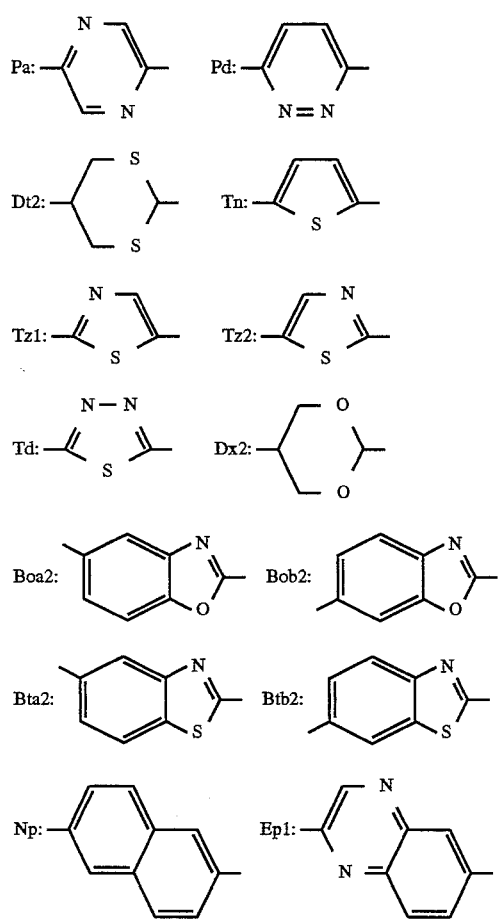

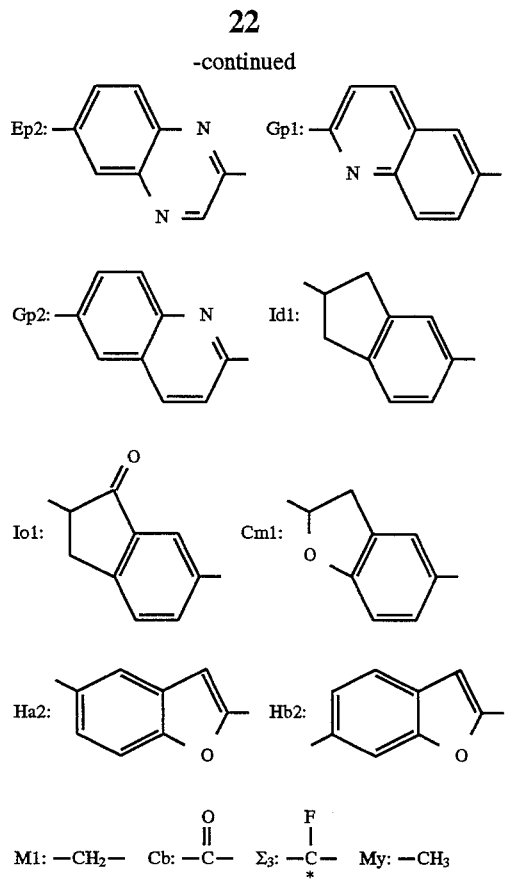

TABLE 1

$$R^{32}-(A^{32}-X^{32})_{m32}-A^{33}-A^{34}-X^{33}-O-R^{33}-\overset{F}{\underset{*}{C}}(R^{34})-R^{35} \quad (III)$$

| No. | $R^{32}$ | $A^{32}$ | $A^{32}$ | $A^{33}$ | $A^{34}$ | $X^{33}$ | $X^{33}$ | $\Sigma 3$ | $R^{34}$ | $R^{35}$ |
|---|---|---|---|---|---|---|---|---|---|---|
| 1 | $C_6H_{13}$ | — | — | Ph | Ph | — | M1 | $\Sigma 3$ | H | $C_8H_{17}$ |
| 2 | $C_8H_{17}O$ | — | — | Ph | Ph | — | M1 | $\Sigma 3$ | H | $C_{18}H_{37}$ |
| 3 | $C_5H_{11}O$ | — | — | Ph | Ph2F | — | M1 | $\Sigma 3$ | H | $C_6H_{13}$ |
| 4 | $CH_3O$ | — | — | Ph | Ph | — | M1 | $\Sigma 3$ | H | $C_6H_{13}$ |
| 5 | $C_6H_{13}CH(CH_3)(CH_2)_2O$ | — | — | Ph | Ph | — | M1 | $\Sigma 3$ | H | $C_6H_{13}$ |
| 6 | $C_7H_{15}O$ | — | — | Ph | Ph23F | — | M1 | $\Sigma 3$ | H | $C_6H_{13}$ |
| 7 | $C_6H_{13}$ | — | — | Ph | Ph | — | M1 | $\Sigma 3$ | H | $C_9H_{19}$ |
| 8 | $C_7H_{15}O$ | — | — | Ph | Ph | — | M1 | $\Sigma 3$ | H | $C_5H_{11}$ |
| 9 | $C_8H_{17}O$ | — | — | Ph | Ph | — | M1 | $\Sigma 3$ | H | $C_6H_{13}$ |
| 10 | $C_8H_{17}$ | — | — | Pr1 | Ph | — | M1 | $\Sigma 3$ | H | $C_8H_{17}$ |
| 11 | $C_{10}H_{21}$ | — | — | Pr2 | Ph | — | M1 | $\Sigma 3$ | H | $C_4H_9$ |
| 12 | $C_{11}H_{23}$ | — | — | Pr2 | Ph | — | M1 | $\Sigma 3$ | H | $C_6H_{13}$ |
| 13 | $C_{12}H_{25}$ | — | — | Pr2 | Ph | — | M1 | $\Sigma 3$ | H | $C_8H_{17}$ |
| 14 | $C_4H_9O$ | — | — | Py1 | Ph | — | M1 | $\Sigma 3$ | H | $C_{10}H_{21}$ |
| 15 | $C_{13}H_{27}$ | — | — | Py2 | Ph | — | M1 | $\Sigma 3$ | H | $C_5H_{11}$ |
| 16 | $C_6H_{13}$ | — | — | Py2 | Ph | — | M1 | $\Sigma 3$ | H | $C_8H_{17}$ |
| 17 | $C_6H_{13}CH(CH_3)CH_2O$ | — | — | Py2 | Ph | — | M1 | $\Sigma 3$ | H | $C_9H_{19}$ |
| 18 | $C_5H_{11}O$ | — | — | Py2 | Ph23F | — | M1 | $\Sigma 3$ | H | $C_4H_9$ |
| 19 | $C_{10}H_{21}$ | — | — | Py2 | Ph3F | — | M1 | $\Sigma 3$ | H | $C_6H_{13}$ |
| 20 | $C_8H_{17}$ | — | — | Py2 | Ph3F | — | M1 | $\Sigma 3$ | H | $C_8H_{17}$ |
| 21 | $C_6H_{13}$ | — | — | Cy | Ph | — | M1 | $\Sigma 3$ | H | $C_4H_9$ |
| 22 | $C_3H_7$ | — | — | Cy | Ph | — | M1 | $\Sigma 3$ | H | $C_5H_{11}$ |
| 23 | $C_5H_{11}$ | — | — | Cy | Ph | — | M1 | $\Sigma 3$ | H | $C_{14}H_{29}$ |
| 24 | $C_{10}H_{21}$ | — | — | Cy | Ph | — | M1 | $\Sigma 3$ | H | $C_{10}H_{21}$ |
| 25 | $C_6H_{13}$ | — | — | Pa | Ph | — | M1 | $\Sigma 3$ | H | $C_{10}H_{21}$ |

TABLE 1-continued $$R^{32}-(A^{32}-X^{32})_{m32}-A^{33}-A^{34}-X^{33}-O-R^{33}-\overset{\overset{F}{|}}{\underset{*}{C}}(R^{34})-R^{35} \quad (III)$$

| No. | $R^{32}$ | $A^{32}$ | $A^{32}$ | $A^{33}$ | $A^{34}$ | $X^{33}$ | $X^{33}$ | $\Sigma 3$ | $R^{34}$ | $R^{35}$ |
|---|---|---|---|---|---|---|---|---|---|---|
| 26 | $C_7H_{15}OCO$ | — | — | Pd | Ph | — | M1 | $\Sigma 3$ | H | $C_3H_7$ |
| 27 | $C_6H_{13}$ | — | — | Dt2 | Ph | — | M1 | $\Sigma 3$ | H | $C_6H_{13}$ |
| 28 | $C_8H_{17}$ | — | — | Tn | Ph | — | M1 | $\Sigma 3$ | H | $C_9H_{19}$ |
| 29 | $C_5H_{11}$ | — | — | Tz1 | Ph | — | M1 | $\Sigma 3$ | H | $C_9H_{19}$ |
| 30 | $C_9H_{19}O$ | — | — | Tz2 | Ph | — | M1 | $\Sigma 3$ | H | $C_6H_{13}$ |
| 31 | $C_2H_5$ | — | — | Td | Ph | — | M1 | $\Sigma 3$ | H | $C_7H_{15}$ |
| 32 | $C_{10}H_{21}$ | — | — | Dx2 | Ph | — | M1 | $\Sigma 3$ | H | $C_8H_{17}$ |
| 33 | $C_6H_{13}$ | — | — | Boa2 | Ph | — | M1 | $\Sigma 3$ | H | $C_{10}H_{21}$ |
| 34 | $C_{15}H_{31}$ | — | — | Bob2 | Ph | — | M1 | $\Sigma 3$ | H | $C_{10}H_{21}$ |
| 35 | $C_7H_{15}$ | — | — | Bta2 | Ph | — | M1 | $\Sigma 3$ | H | $C_6H_{13}$ |
| 36 | $C_{16}H_{33}O$ | — | — | Btb2 | Ph | — | M1 | $\Sigma 3$ | H | $C_9H_{19}$ |
| 37 | $C_6H_{13}$ | — | — | Np | Ph | — | M1 | $\Sigma 3$ | H | $C_6H_{13}$ |
| 38 | $C_5H_{11}$ | — | — | Np | Ph | — | Cb | $\Sigma 3$ | H | $C_4H_9$ |
| 39 | $C_8H_{17}CH(CH_3)CH_2O$ | — | — | Ep1 | Ph | — | Cb | $\Sigma 3$ | H | $C_6H_{13}$ |
| 40 | $C_4H_9$ | — | — | Ep2 | Ph | — | M1 | $\Sigma 3$ | H | $C_8H_{17}$ |
| 41 | $C_6H_{13}$ | — | — | Gp1 | Ph | — | M1 | $\Sigma 3$ | H | $C_6H_{13}$ |
| 42 | $C_7H_{15}$ | — | — | Gp2 | Ph | — | M1 | $\Sigma 3$ | H | $C_{12}H_{25}$ |
| 43 | $C_6H_{13}$ | — | — | Cm1 | Ph | — | M1 | $\Sigma 3$ | H | $C_{10}H_{21}$ |
| 44 | $C_8H_{17}$ | — | — | Io1 | Ph | — | M1 | $\Sigma 3$ | H | $C_{12}H_{25}$ |
| 45 | $C_{18}H_{37}$ | — | — | Id1 | Ph | M1 | M1 | $\Sigma 3$ | H | $C_6H_{13}$ |
| 46 | $C_{11}H_{23}$ | — | — | Id1 | Ph | — | M1 | $\Sigma 3$ | H | $C_5H_{11}$ |
| 47 | $C_8H_{17}$ | — | — | Id1 | Ph | — | M1 | $\Sigma 3$ | H | $C_5H_{11}$ |
| 48 | $C_5H_{11}$ | — | — | Id1 | Ph2F | — | M1 | $\Sigma 3$ | H | $C_6H_{13}$ |
| 49 | $C_6H_{13}$ | — | — | Tn | Ph | — | M1 | $\Sigma 3$ | H | $C_6H_{13}$ |
| 50 | $C_4H_9O$ | — | — | Tz2 | Ph | — | M1 | $\Sigma 3$ | H | $C_8H_{17}$ |
| 51 | $C_{12}H_{25}$ | — | — | Btb2 | Ph | — | M1 | $\Sigma 3$ | H | $C_{10}H_{21}$ |
| 52 | $C_6H_{13}O$ | — | — | Btb2 | Ph | — | M1 | $\Sigma 3$ | H | $C_6H_{13}$ |
| 53 | $CH_2=CH(CH_2)_3O$ | — | — | Ep2 | Ph | — | M1 | $\Sigma 3$ | H | $C_5H_{11}$ |
| 54 | $C_9H_{19}$ | — | — | Gp2 | Ph | — | M1 | $\Sigma 3$ | H | $C_6H_{13}$ |
| 55 | $C_5H_{11}$ | — | — | Np | Ph | — | M1 | $\Sigma 3$ | H | $C_6H_{13}$ |
| 56 | $C_6H_{13}$ | Ph | — | Ph | Ph | Cb | M1 | $\Sigma 3$ | H | $C_6H_{13}$ |
| 57 | $C_8H_{17}COO$ | Pr2 | — | Ph | Ph | — | M1 | $\Sigma 3$ | H | $C_5H_{11}$ |
| 58 | $C_3H_7$ | Py2 | — | Ph | Ph | — | M1 | $\Sigma 3$ | H | $C_4H_9$ |
| 59 | $C_5H_{11}$ | — | — | Ha2 | Ph | — | M1 | $\Sigma 3$ | H | $C_4H_9$ |
| 60 | $C_6H_{13}$ | Ph | COO | — | Ph | — | M1 | $\Sigma 3$ | H | $C_6H_{13}$ |
| 61 | $C_9H_{19}$ | Ph | — | Pr1 | Ph | — | Cb | $\Sigma 3$ | H | $C_6H_{13}$ |
| 62 | $C_{13}H_{27}$ | Ph | — | Cy | Ph3Br | M1 | Cb | $\Sigma 3$ | H | $C_5H_{11}$ |
| 63 | $C_{10}H_{21}O$ | Ph | OCO | Py1 | Ph | — | M1 | $\Sigma 3$ | My | $C_6H_{13}$ |
| 64 | $C_7H_{15}$ | Ph | — | Py2 | Ph | — | M1 | $\Sigma 3$ | H | $C_5H_{11}$ |
| 65 | $C_4H_9$ | Ph3TF | COO | — | Ph | — | M1 | $\Sigma 3$ | H | $C_6H_{13}$ |
| 66 | $CH_3$ | — | — | Hb2 | Ph | — | M1 | $\Sigma 3$ | H | $C_8H_{17}$ |
| 67 | $C_8H_{17}$ | Ph | — | Tn | Ph | — | M1 | $\Sigma 3$ | H | $(CH_2)_3CH(CH_3)_2$ |
| 68 | $C_2H_5$ | Ph | — | Tz1 | Ph2M | — | M1 | $\Sigma 3$ | H | $C_8H_{17}$ |
| 69 | $C_6H_{13}$ | Ph | — | Ph | Ph | — | M1 | $\Sigma 3$ | H | $C_8H_{17}$ |
| 70 | $C_{10}H_{21}$ | Ph | — | Td | Ph | — | M1 | $\Sigma 3$ | H | $(CH_2)_3CH(CH_3)_2$ |
| 71 | $C_{10}H_{21}$ | — | — | Ph | Py1 | — | M1 | $\Sigma 3$ | H | $C_6H_{13}$ |
| 72 | $C_6H_{13}$ | — | — | Ph | Py1 | — | M1 | $\Sigma 3$ | H | $C_4H_9$ |
| 73 | $C_6H_{13}OCO$ | — | — | Ph | Py1 | — | M1 | $\Sigma 3$ | H | $C_6H_{13}$ |
| 74 | $C_7H_{15}$ | — | — | Ph | Pr2 | — | M1 | $\Sigma 3$ | H | $C_5H_{11}$ |
| 75 | $C_9H_{19}$ | — | — | Ph | Pr2 | — | M1 | $\Sigma 3$ | H | $(CH_2)_3CH(CH_3)_2$ |
| 76 | $C_7H_{15}$ | — | — | Ph | Pr2 | — | M1 | $\Sigma 3$ | H | $C_6H_{13}$ |
| 77 | $C_5H_{11}O$ | — | — | Py2 | Cy | — | M1 | $\Sigma 3$ | H | $C_{10}H_{21}$ |
| 78 | $C_4H_9$ | — | — | Ph | Cy | — | M1 | $\Sigma 3$ | H | $C_{12}H_{25}$ |
| 79 | $C_{12}H_{25}$ | — | — | Ph | Cy | — | M1 | $\Sigma 3$ | H | $C_5H_{11}$ |
| 80 | $C_6H_{13}C\equiv C$ | — | — | Ph | Pa | — | M1 | $\Sigma 3$ | H | $C_{10}H_{21}$ |
| 81 | $C_8H_{17}O$ | — | — | Ph | Pd | — | M1 | $\Sigma 3$ | My | $C_6H_{13}$ |
| 82 | $C_3H_7$ | — | — | Ph2Cl | Tn | — | M1 | $\Sigma 3$ | H | $C_{10}H_{21}$ |
| 83 | $C_4H_9$ | — | — | Ph | Tn | — | M1 | $\Sigma 3$ | H | $C_8H_{17}$ |
| 84 | $C_8H_{17}$ | — | — | Ph | Tz1 | — | M1 | $\Sigma 3$ | H | $C_8H_{17}$ |
| 85 | $C_4H_9OCH(CH_3)COO$ | — | — | Ph | Tz1 | — | M1 | $\Sigma 3$ | H | $C_7H_{15}$ |
| 86 | $C_6H_{13}$ | — | — | Ph2F | Td | — | M1 | $\Sigma 3$ | My | $(CH_2)_3CH(CH_3)C_6H_{13}$ |
| 87 | $C_5H_{11}$ | — | — | Py2 | Np | — | M1 | $\Sigma 3$ | H | $C_9H_{19}$ |
| 88 | $CH_3$ | — | — | Ph | Np | — | M1 | $\Sigma 3$ | H | $C_{12}H_{25}$ |
| 89 | $C_{11}H_{23}$ | — | — | Ph | Np | — | M1 | $\Sigma 3$ | H | $C_6H_{13}$ |
| 90 | $C_5H_{11}$ | — | — | Py1 | Ep1 | — | M1 | $\Sigma 3$ | H | $C_5H_{11}$ |
| 91 | $C_8H_{17}OC_2H_4$ | — | — | Ph | Ep1 | — | M1 | $\Sigma 3$ | H | $C_5H_{11}$ |
| 92 | $C_6H_{13}$ | — | — | Ph | Ep1 | — | M1 | $\Sigma 3$ | H | $C_8H_{17}$ |
| 93 | $C_9H_{19}$ | — | — | Py1 | Gp1 | — | M1 | $\Sigma 3$ | H | $C_5H_{11}$ |
| 94 | $C_8H_{17}$ | — | — | Ph | Gp1 | — | M1 | $\Sigma 3$ | H | $C_6H_{13}$ |
| 95 | $C_3H_7COO$ | — | — | Ph | Gp1 | — | M1 | $\Sigma 3$ | H | $C_8H_{17}$ |
| 96 | $C_4H_9$ | — | — | Ph | Id1 | — | M1 | $\Sigma 3$ | H | $C_8H_{17}$ |

TABLE 1-continued $$R^{32}-(A^{32}-X^{32})_{m32}-A^{33}-A^{34}-X^{33}-O-R^{33}-\underset{*}{C}(R^{34})-R^{35} \quad (III)$$
$$\text{with F substituent on } C^*$$

| No. | $R^{32}$ | $A^{32}$ | $A^{32}$ | $A^{33}$ | $A^{34}$ | $X^{33}$ | $X^{33}$ | $\Sigma 3$ | $R^{34}$ | $R^{35}$ |
|-----|----------|----------|----------|----------|----------|----------|----------|------------|----------|----------|
| 97  | $C_{12}H_{25}$ | — | — | Ph | Io1 | Cb | M1 | $\Sigma 3$ | H | $C_6H_{13}$ |
| 98  | $C_{10}H_{21}$ | — | — | Ph | Cm1 | — | M1 | $\Sigma 3$ | H | $C_8H_{17}$ |
| 99  | $C_6H_{13}$ | — | — | Ph | Ph | — | M1 | $\Sigma 3$ | H | $C_8H_{17}$ |
| 100 | $C_3H_7$ | Ph | $OCH_2$ | — | Py1 | — | M1 | $\Sigma 3$ | H | $C_{12}H_{25}$ |
| 101 | $C_4H_9$ | Ph2CN | — | Ph | Pr1 | — | M1 | $\Sigma 3$ | H | $C_{10}H_{21}$ |
| 102 | $C_5H_{11}$ | Ph | $CH_2O$ | Ph3F | Tz1 | Cb | M1 | $\Sigma 3$ | H | $C_6H_{13}$ |
| 103 | $C_6H_{13}$ | Ph | — | Ph | Tn | — | M1 | $\Sigma 3$ | H | $C_8H_{17}$ |
| 104 | $C_7H_{15}$ | Tn | — | Ph | Py1 | — | M1 | $\Sigma 3$ | H | $C_8H_{17}$ |
| 105 | $C_{10}H_{21}$ | Ph | — | Ph | Cy1 | — | M1 | $\Sigma 3$ | H | $C_5H_{11}$ |

The optically active compound (b) may particularly preferably be represented by the formula (III) wherein $R^{32}$ and $R^{35}$ independently denote a linear or branched alkyl group; m32 is 0; $R^{33}$ is —$CH_2$— or —CO—; $R^{34}$ is H or $CH_3$; $A^{33}$ is;

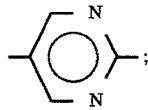

$A^{34}$ is

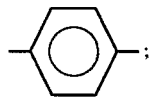

and $X^{33}$ is a single bond or —$C_2$— when $R^{33}$ is —CO—, or $X^{33}$ is a single bond, —CO— or —$C_2$— when Such a compound (b) is effective in allowing a low viscosity and a wide temperature range showing a chiral smectic phase to the resultant liquid crystal composition de to its phenylpyrimidine skeleton.

Compound (b) of the formula

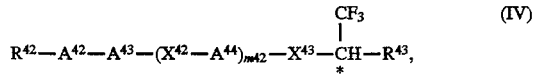

in which
$R^{42}$ is a linear or branched alkyl group having 1–18 carbon atoms capable of including at least one —$CH_2$— group which can be replaced by —$Y^4$—, —$Y^4$—CO—, —CO—$Y^4$—, —CO—, —OCOO—, —CH=CH— or —C≡C— wherein $Y^4$ is O or S;

$R^{43}$ is a linear or branched alkyl group having 1–10 carbon atoms;

m42 is 0, 1 or 2;

$A^{42}$, $A^{43}$ and $A^{44}$ independently denote a single bond 1,4-phenylene; pyridine-2,5-diyl; pyrimidine-2,5-diyl; pyrazine-2,5-diyl; pyridazine- 3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$X^{42}$ is a single bond, —COO—, —OCO—, —$CH_2O$— or —$OCH_2$—;

$X^{43}$ is —O—, —COO—, —$OCH_2$—, —$OCH_2CH_2$—, —$OCOCH_2$—, —$CH_2O$—, —$COOCH_2CH_2$—, —$CH_2OCH_2CH_2$— or —$CH_2COOCH_2$;

$C^*$ is an asymmetric carbon atom; and $A^{42}$, $A^{43}$ and $A^{44}$ each may have one or two substituents comprising F, Cl, Br, $CH_3$, $CF_3$ and/or CN.

Examples of the compound (b) of the formula (IV) may include those as described in JP-A Nos. 1-160986, 1-242543, 2-000127, 2-069440, 2-295943, 3-043488, 3-058980 3-083971, 3-193774, 3-223232, 3-236353, 4-013797, 4-253789 and 4-264052. The compound (b) of the formula (IV) may be produced through processes as described in these documents.

Specific and preferred examples of the optically active compound (b) of the formula (IV) may include those represented by the following structural formulae (Ex. Comp. Nos. 4–1 to 4–105 indicated as Nos. 1–105 in Table 2 below) including abbreviations used for the respective groups listed below in addition to those listed for Table 1. In Table 2, the structural formula (Ex. Comp. No. 4–60 indicated as No. 60) has m42 being 2.

Om: —$OCH_2$— Od: —$OCH_2CH_2$— Em: —$OCOCH_2$—

Mo: —$CH_2$—O— Ced: —$COOCH_2CH_2$—

Mod: —$CH_2OCH_2CH_2$— Mce: —$CH_2COOCH_2$—

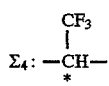

Mcd: —$CH_2$—O—$CH_2$—

TABLE 2

$$R^{42}-A^{42}-A^{43}-(X^{42}-A^{44})_{m42}-X^{43}-\overset{\overset{CF_3}{|}}{\underset{*}{CH}}-R^{43} \qquad (IV)$$

| No. | R⁴² | A⁴² | A⁴³ | X⁴² | A⁴⁴ | A⁴³ | Σ4 | R⁴³ |
|---|---|---|---|---|---|---|---|---|
| 1 | C₆H₁₃ | Ph | Ph | — | — | Om | Σ4 | C₈H₁₇ |
| 2 | C₈H₁₇O | Ph | Ph | — | — | Mo | Σ4 | C₈H₁₇ |
| 3 | C₅H₁₁O | Ph | Ph2F | — | — | Om | Σ4 | C₆H₁₃ |
| 4 | CH₃O | Ph | Ph | — | — | Om | Σ4 | C₆H₁₃ |
| 5 | C₆H₁₃CH(CH₃)(CH₂)₂O | Ph | Ph | — | — | Om | Σ4 | C₆H₁₃ |
| 6 | C₇H₁₅O | Ph | P23F | — | — | Em | Σ4 | C₆H₁₃ |
| 7 | C₆H₁₃ | Ph | Ph | — | — | Od | Σ4 | C₉H₁₉ |
| 8 | C₇H₁₅O | Ph | Ph | — | — | Em | Σ4 | C₅H₁₁ |
| 9 | C₈H₁₇O | Ph | Ph | — | — | Om | Σ4 | C₆H₁₃ |
| 10 | C₈H₁₇ | Pr1 | Ph | — | — | Em | Σ4 | C₈H₁₇ |
| 11 | C₁₀H₂₁ | Pr2 | Ph | — | — | Od | Σ4 | C₄H₉ |
| 12 | C₁₁H₂₃ | Pr2 | Ph | — | — | Em | Σ4 | C₆H₁₃ |
| 13 | C₁₂H₂₅ | Pr2 | Ph | — | — | Om | Σ4 | C₈H₁₇ |
| 14 | C₄H₉O | Py1 | Ph | — | — | Em | Σ4 | C₁₀H₂₁ |
| 15 | C₁₂H₂₅ | Py2 | Ph | — | — | Em | Σ4 | C₄H₉ |
| 16 | C₆H₁₃ | Py2 | Ph | — | — | Em | Σ4 | C₈H₁₇ |
| 17 | C₆H₁₃CH(CH₃)CH₂O | Py2 | Ph | — | — | Om | Σ4 | C₉H₁₉ |
| 18 | C₅H₁₁O | Py2 | P23F | — | — | Em | Σ4 | C₄H₉ |
| 19 | C₁₀H₂₁ | Py2 | Ph | — | — | Em | Σ4 | C₆H₁₃ |
| 20 | C₈H₁₇ | Py2 | Ph3F | — | — | Om | Σ4 | C₈H₁₇ |
| 21 | C₆H₁₃ | Cy | Ph | — | — | Om | Σ4 | C₄H₉ |
| 22 | C₃H₇ | Cy | Ph | — | — | Em | Σ4 | C₅H₁₁ |
| 23 | C₅H₁₁ | Cy | Ph | — | — | Om | Σ4 | C₄H₉ |
| 24 | C₁₀H₂₁ | Cy | Ph | — | — | Em | Σ4 | C₁₀H₂₁ |
| 25 | C₆H₁₃ | Pa | Ph | — | — | Om | Σ4 | C₁₀H₂₁ |
| 26 | C₇H₁₅OCO | Pd | Ph | — | — | Om | Σ4 | C₃H₇ |
| 27 | C₆H₁₃ | Dt2 | Ph | — | — | Em | Σ4 | C₆H₁₃ |
| 28 | C₈H₁₇ | Tn | Ph | — | — | Em | Σ4 | C₉H₁₉ |
| 29 | C₅H₁₁ | Tz1 | Ph | — | — | Em | Σ4 | C₉H₁₉ |
| 30 | C₉H₁₉O | Tz2 | Ph | — | — | Od | Σ4 | C₆H₁₃ |
| 31 | C₂H₅ | Td | Ph | — | — | Mo | Σ4 | C₇H₁₅ |
| 32 | C₁₀H₂₁ | Dx2 | Ph | — | — | Om | Σ4 | C₈H₁₇ |
| 33 | C₆H₁₃ | Boa2 | Ph | — | — | Ced | Σ4 | C₁₀H₂₁ |
| 34 | C₁₅H₃₁ | Bob2 | Ph | — | — | Om | Σ4 | C₁₀H₂₁ |
| 35 | C₇H₁₅ | Bta2 | Ph | — | — | Om | Σ4 | C₆H₁₃ |
| 36 | C₁₆H₃₃O | Btb2 | Ph | — | — | Em | Σ4 | C₉H₁₉ |
| 37 | C₆H₁₃ | Np | Ph | — | — | Em | Σ4 | C₆H₁₃ |
| 38 | C₅H₁₁ | Np | Ph | — | — | Em | Σ4 | C₄H₉ |
| 39 | C₈H₁₇CH(CH₃)CH₂O | Ep1 | Ph | — | — | Om | Σ4 | C₆H₁₃ |
| 40 | C₄H₉ | Ep2 | Ph | — | — | Om | Σ4 | C₈H₁₇ |
| 41 | C₆H₁₃ | Gp1 | Ph | — | — | Em | Σ4 | C₆H₁₃ |
| 42 | C₇H₁₅ | Gp2 | Ph | — | — | Em | Σ4 | C₂H₅ |
| 43 | C₆H₁₃ | Cm1 | Ph | — | — | Om | Σ4 | C₁₀H₂₁ |
| 44 | C₈H₁₇ | Io1 | Ph | — | — | Om | Σ4 | C₂H₅ |
| 45 | C₁₈H₃₇ | Id1 | Ph | — | — | Em | Σ4 | C₆H₁₃ |
| 46 | C₁₁H₂₃ | Id1 | Ph | — | — | Em | Σ4 | C₅H₁₁ |
| 47 | C₈H₁₇ | Id1 | Ph | — | — | Od | Σ4 | C₅H₁₁ |
| 48 | C₅H₁₁ | Id1 | Ph2F | — | — | Om | Σ4 | C₆H₁₃ |
| 49 | C₆H₁₃ | Tn | Ph | — | — | Mo | Σ4 | C₆H₁₃ |
| 50 | C₄H₉O | Tz2 | Ph | — | — | Om | Σ4 | C₈H₁₇ |
| 51 | C₁₂H₂₅ | Btb2 | Ph | — | — | Om | Σ4 | C₁₀H₂₁ |
| 52 | C₆H₁₃O | Btb2 | Ph | — | — | Od | Σ4 | C₆H₁₃ |
| 53 | CH₂=CH(CH₂)₃O | Ep2 | Ph | — | — | Om | Σ4 | C₅H₁₁ |
| 54 | C₉H₁₉ | Gp2 | Ph | — | — | Mcd | Σ4 | C₆H₁₃ |
| 55 | C₅H₁₁ | Np | Ph | — | — | Em | Σ4 | C₆H₁₃ |
| 56 | C₆H₁₃ | Ph | Ph | COO | Ph | Od | Σ4 | C₆H₁₃ |
| 57 | C₈H₁₇COO | Pr2 | Ph | OCO | Ph | Om | Σ4 | C₅H₁₁ |
| 58 | C₃H₇ | Py2 | Ph | — | Ph | Em | Σ4 | C₄H₉ |
| 59 | C₅H₁₁ | — | Ha2 | — | Ph | Em | Σ4 | C₄H₉ |
| 60 | C₆H₁₃ | — | Py2 | COO | Ph | Em | Σ4 | C₆H₁₃ |
| 61 | C₉H₁₉ | Ph | Py1 | — | Ph | Om | Σ4 | C₆H₁₃ |
| 62 | C₁₃H₂₇ | Ph | Cy | OCO | P3Br | Em | Σ4 | C₅H₁₁ |
| 63 | C₁₀H₂₁O | Ph | Py1 | — | Ph | Om | Σ4 | C₆H₁₃ |
| 64 | C₇H₁₅ | Ph | Py2 | OCH₂ | Ph | Em | Σ4 | C₅H₁₁ |
| 65 | C₄H₉ | Ph3TF | — | COO | Ph | Om | Σ4 | C₆H₁₃ |
| 66 | CH₃ | Hb2 | Ph | — | — | Em | Σ4 | C₈H₁₇ |
| 67 | C₈H₁₇ | Ph | Tn | — | Ph | Om | Σ4 | (CH₂)₃CH(CH₃)₂ |
| 68 | C₂H₅ | Ph | Tz1 | — | Ph2M | Em | Σ4 | C₈H₁₇ |
| 69 | C₆H₁₃ | Ph | Ph | — | Ph | Om | Σ4 | C₈H₁₇ |
| 70 | C₁₀H₂₁ | Ph | Td | — | Ph | Em | Σ4 | (CH₂)₃CH(CH₃)₂ |
| 71 | C₁₀H₂₁ | Ph | Py1 | — | — | Mce | Σ4 | C₆H₁₃ |
| 72 | C₆H₁₃ | Ph | Py1 | — | — | Em | Σ4 | C₄H₉ |

TABLE 2-continued

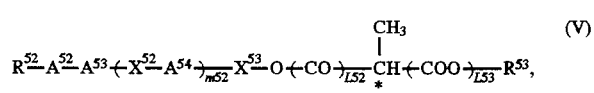

$$R^{42}-A^{42}-A^{43}-(X^{42}-A^{44})_{m42}-X^{43}-\underset{*}{CH}-R^{43} \quad (IV)$$

with CF$_3$ attached to CH.

| No. | R$^{42}$ | A$^{42}$ | A$^{43}$ | X$^{42}$ | A$^{44}$ | A$^{43}$ | Σ4 | R$^{43}$ |
|---|---|---|---|---|---|---|---|---|
| 73 | C$_6$H$_{13}$OCO | Ph | Py1 | — | — | Em | Σ4 | C$_6$H$_{13}$ |
| 74 | C$_7$H$_{15}$ | Ph | Pr2 | — | — | Em | Σ4 | C$_5$H$_{11}$ |
| 75 | C$_9$H$_{19}$ | Ph | Pr2 | — | — | Em | Σ4 | (CH$_2$)$_3$CH(CH$_3$)$_2$ |
| 76 | C$_7$H$_{15}$ | Ph | Pr2 | — | — | Om | Σ4 | C$_6$H$_{13}$ |
| 77 | C$_5$H$_{11}$O | Py2 | Cy | — | — | Em | Σ4 | C$_{10}$H$_{21}$ |
| 78 | C$_4$H$_9$ | Ph | Cy | — | — | Om | Σ4 | C$_2$H$_5$ |
| 79 | C$_{12}$H$_{25}$ | Ph | Cy | — | — | Em | Σ4 | C$_5$H$_{11}$ |
| 80 | C$_6$H$_{13}$C≡C | Ph | Pa | — | — | Em | Σ4 | C$_{10}$H$_{21}$ |
| 81 | C$_8$H$_{17}$O | Ph | Pd | — | — | Om | Σ4 | C$_6$H$_{13}$ |
| 82 | C$_3$H$_7$ | Ph2Cl | Tn | — | — | Em | Σ4 | C$_{10}$H$_{21}$ |
| 83 | C$_4$H$_9$ | Ph | Tn | — | — | Em | Σ4 | C$_8$H$_{17}$ |
| 84 | C$_8$H$_{17}$ | Ph | Tz1 | — | — | Em | Σ4 | C$_8$H$_{17}$ |
| 85 | C$_4$H$_9$OCH(CH$_3$)COO | Ph | Tz1 | — | — | Om | Σ4 | C$_7$H$_{15}$ |
| 86 | C$_6$H$_{13}$ | Ph2F | Td | — | — | Om | Σ4 | (CH$_2$)$_3$CH(CH$_3$)C$_6$H$_{13}$ |
| 87 | C$_5$H$_{11}$ | Py2 | Np | — | — | Em | Σ4 | C$_9$H$_{19}$ |
| 88 | CH$_3$ | Ph | Np | — | — | Mce | Σ4 | C$_2$H$_5$ |
| 89 | C$_{11}$H$_{23}$ | Ph | Np | — | — | Mod | Σ4 | C$_6$H$_{13}$ |
| 90 | C$_5$H$_{11}$ | Py1 | Ep1 | — | — | Om | Σ4 | C$_5$H$_{11}$ |
| 91 | C$_8$H$_{17}$OC$_2$H$_4$ | Ph | Ep1 | — | — | Om | Σ4 | C$_5$H$_{11}$ |
| 92 | C$_6$H$_{13}$ | Ph | Ep1 | — | — | Em | Σ4 | C$_8$H$_{17}$ |
| 93 | C$_9$H$_{19}$ | Py1 | Gp1 | — | — | Om | Σ4 | C$_5$H$_{11}$ |
| 94 | C$_8$H$_{17}$ | Ph | Gp1 | — | — | Em | Σ4 | C$_6$H$_{13}$ |
| 95 | C$_3$H$_7$COO | Ph | Gp1 | — | — | Om | Σ4 | C$_8$H$_{17}$ |
| 96 | C$_4$H$_9$ | Ph | Id1 | — | — | Om | Σ4 | C$_8$H$_{17}$ |
| 97 | C$_{12}$H$_{25}$ | Ph | Io1 | — | — | Em | Σ4 | C$_6$H$_{13}$ |
| 98 | C$_{10}$H$_{21}$ | Ph | Cm1 | — | — | Om | Σ4 | C$_8$H$_{17}$ |
| 99 | C$_6$H$_{13}$ | Ph | Ph | — | — | Em | Σ4 | C$_8$H$_{17}$ |
| 100 | C$_3$H$_7$ | Ph | — | OCH$_2$ | Py1 | Om | Σ4 | C$_2$H$_5$ |
| 101 | C$_4$H$_9$ | Ph2CN | Ph | — | Pr1 | Om | Σ4 | C$_{10}$H$_{21}$ |
| 102 | C$_5$H$_{11}$ | Ph | Ph3F | OCH$_2$ | Tz1 | Em | Σ4 | C$_6$H$_{13}$ |
| 103 | C$_6$H$_{13}$ | Ph | Ph | OCO | Tn | Om | Σ4 | C$_8$H$_{17}$ |
| 104 | C$_7$H$_{15}$ | Tn | Ph | — | Py1 | Od | Σ4 | C$_8$H$_{17}$ |
| 105 | C$_{10}$H$_{21}$ | Ph | Ph | — | Cy1 | Em | Σ4 | C$_5$H$_{11}$ |

The optically active compound (b) may particularly preferably be represented by the formula (IV) wherein $R^{42}$ is a linear or branched alkyl or alkoxy group having 1–18 carbon atoms; $R^{43}$ is a linear or branched alkyl group having 1–10 carbon atoms; m42 is 0; $A^{42}$ is ;

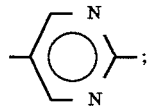

$A^{43}$ is;

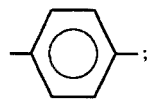

and $X^{43}$ is —O—, —OCH$_2$—, —COO—, —COOCH$_2$CH$_2$— or —OCH$_2$CH$_2$—. Such a compound (b) is effective in allowing a low viscosity and a wide temperature range showing a chiral smectic phase to the resultant liquid crystal composition due to its phenyl-pyrimidine skeleton.

Compound (b) of the formula (V)

$$R^{52}-A^{52}-A^{53}+X^{52}-A^{54}\overline{\overline{)_{m52}}}X^{53}-O+CO\overline{\overline{)_{l52}}}\underset{*}{CH}+COO\overline{\overline{)_{l53}}}R^{53}, \quad (V)$$

with CH$_3$ attached to CH.

in which $R_{52}$ is a linear or branched alkyl group having 1–18 carbon atoms capable of including at least one —CH$_2$— group which can be replaced by —Y$^5$—, —Y$^5$—CO—, —CO—Y$^5$—, —CO—, —OCOO—, —CH=CH— or —C≡C— wherein Y$^5$ is O or S;

$R^{53}$ is a linear or branched alkyl or alkoxy group having 1–10 carbon atoms;

m52 is 0, 1 or 2;

$A^{52}$, $A^{53}$ and $A^{54}$ each may have one or two substituents comprising F, Cl, Br, CH$_3$, CF$_3$ and/or CN and independently denote a single bond 1,4-phenylene; pyridine-2,5-diyl pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1-18 carbon atoms; coumaran-2,5-diyl; or 2-alkylcoumaran-2,5-diyl having a linear or branched alkyl group having 1-18 carbon atoms;

$X^{52}$ is a single bond, —COO—, —OCO—, —CH$_2$O— or —OCH$_2$—;

$X^{53}$ is a single bond, —CO— or —CH$_2$— when L52 is 0, or $X^{53}$ is a single bond or —CH$_2$— when L52 is 1;

L52 and L53 are 0 or 1; and

C, is an asymmetric carbon atom.

Examples of the compound (b) of the formula (V) may include those as described in JP-A Nos. 61-293288 and 63-44551. The compound (b) of the formula (V) may be produced through processes as described in these documents.

Specific and preferred examples of the optically active compound (b) of the formula (V) may include those represented by the following structural formulae (Ex. Comp. Nos. 5-1 to 5-105 indicated as Nos. 1-105 in Table 3 below) including abbreviations used for the respective groups listed below in addition to those listed for Table 1. In Table 3, the structural formula (Ex. Comp. No. 5-59 indicated as No. 59) has m52 being 2.

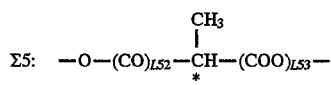

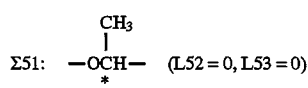

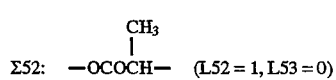

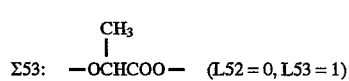

TABLE 3

$$R^{52}-A^{52}-A^{53}-(X^{52}-A^{54})_{m52}-X^{53}-O-(CO)_{L52}-\overset{CH_3}{\underset{*}{CH}}-(COO)_{L53}-R^{53} \quad (V)$$

| No. | $R^{52}$ | $A^{52}$ | $A^{53}$ | $X^{52}$ | $A^{54}$ | $X^{53}$ | Σ5 | $R^{53}$ |
|---|---|---|---|---|---|---|---|---|
| 1 | $C_6H_{13}$ | Ph | Ph | — | — | — | Σ51 | $C_8H_{17}$ |
| 2 | $C_8H_{17}O$ | Ph | Ph | — | — | — | Σ53 | $C_8H_{17}$ |
| 3 | $C_5H_{11}O$ | Ph | Ph2F | — | — | — | Σ51 | $C_6H_{13}$ |
| 4 | $CH_3O$ | Ph | Ph | — | — | — | Σ53 | $C_6H_{13}$ |
| 5 | $C_6H_{13}CH(CH_3)(CH_2)_2O$ | Ph | Ph | — | — | — | Σ51 | $C_6H_{13}$ |
| 6 | $C_7H_{15}O$ | Ph | P23F | — | — | — | Σ53 | $C_6H_{13}$ |
| 7 | $C_6H_{13}$ | Ph | Ph | — | — | —CO— | Σ51 | $C_9H_{19}$ |
| 8 | $C_7H_{15}O$ | Ph | Ph | — | — | —CO— | Σ53 | $C_5H_{11}$ |
| 9 | $C_8H_{17}O$ | Ph | Ph | — | — | — | Σ51 | $C_6H_{13}$ |
| 10 | $C_8H_{17}$ | Pr1 | Ph | — | — | — | Σ53 | $C_8H_{17}$ |
| 11 | $C_{10}H_{21}$ | Pr2 | Ph | — | — | — | Σ51 | $C_4H_9$ |
| 12 | $C_{11}H_{23}$ | Pr2 | Ph | — | — | — | Σ53 | $C_6H_{13}$ |
| 13 | $C_{12}H_{25}$ | Pr2 | Ph | — | — | — | Σ51 | $C_8H_{17}$ |
| 14 | $C_4H_9O$ | Py1 | Ph | — | — | — | Σ51 | $C_{10}H_{21}$ |
| 15 | $C_{13}H_{27}$ | Py2 | Ph | — | — | — | Σ53 | $C_5H_{11}$ |
| 16 | $C_7H_{15}$ | Py2 | Ph | — | — | — | Σ52 | $OC_5H_{11}$ |
| 17 | $C_6H_{13}CH(CH_3)CH_2O$ | Py2 | Ph | — | — | — | Σ51 | $C_9H_{19}$ |
| 18 | $C_5H_{11}O$ | Py2 | P23F | — | — | — | Σ52 | $C_4H_9$ |
| 19 | $C_{10}H_{21}$ | Py2 | Ph | — | — | — | Σ53 | $C_6H_{13}$ |
| 20 | $C_8H_{17}$ | Py2 | Ph3F | — | — | — | Σ51 | $C_8H_{17}$ |
| 21 | $C_6H_{13}$ | Cy | Ph | — | — | — | Σ52 | $OC_4H_9$ |
| 22 | $C_3H_7$ | Cy | Ph | — | — | —CH$_2$— | Σ53 | $C_5H_{11}$ |
| 23 | $C_5H_{11}$ | Cy | Ph | — | — | — | Σ51 | $C_4H_9$ |
| 24 | $C_{10}H_{21}$ | Cy | Ph | — | — | —CO— | Σ53 | $C_{10}H_{21}$ |
| 25 | $C_6H_{13}$ | Pa | Ph | — | — | — | Σ53 | $C_{10}H_{21}$ |
| 26 | $C_7H_{15}OCO$ | Pd | Ph | — | — | — | Σ51 | $C_3H_7$ |
| 27 | $C_6H_{13}$ | Dt2 | Ph | — | — | — | Σ53 | $C_6H_{13}$ |
| 28 | $C_8H_{17}$ | Tn | Ph | — | — | — | Σ53 | $C_9H_{19}$ |
| 29 | $C_5H_{11}$ | Tz1 | Ph | — | — | — | Σ51 | $C_9H_{19}$ |
| 30 | $C_9H_{19}O$ | Tz2 | Ph | — | — | — | Σ52 | $C_6H_{13}$ |
| 31 | $C_2H_5$ | Td | Ph | — | — | — | Σ51 | $C_7H_{15}$ |
| 32 | $C_{10}H_{21}$ | Dx2 | Ph | — | — | — | Σ51 | $C_8H_{17}$ |
| 33 | $C_6H_{13}$ | Boa2 | Ph | — | — | — | Σ52 | $OC_{10}H_{21}$ |
| 34 | $C_{15}H_{31}$ | Bob2 | Ph | — | — | — | Σ53 | $C_{10}H_{21}$ |
| 35 | $C_7H_{15}$ | Bta2 | Ph | — | — | — | Σ53 | $C_6H_{13}$ |
| 36 | $C_{16}H_{33}O$ | Btb2 | Ph | — | — | — | Σ53 | $C_9H_{19}$ |
| 37 | $C_6H_{13}$ | Np | Ph | — | — | —CO— | Σ53 | $C_9H_{19}$ |
| 38 | $C_5H_{11}$ | Np | Ph | — | — | — | Σ51 | $C_4H_9$ |
| 39 | $C_8H_{17}CH(CH_3)CH_2O$ | Ep1 | Ph | — | — | — | Σ53 | $C_6H_{13}$ |
| 40 | $C_4H_9$ | Ep2 | Ph | — | — | —CH$_2$— | Σ51 | $C_8H_{17}$ |
| 41 | $C_6H_{13}$ | Gp1 | Ph | — | — | — | Σ53 | $C_6H_{13}$ |
| 42 | $C_7H_{15}$ | Gp2 | Ph | — | — | — | Σ51 | $C_2H_5$ |
| 43 | $C_6H_{13}$ | Cm1 | Ph | — | — | — | Σ53 | $C_{10}H_{21}$ |
| 44 | $C_8H_{17}$ | Io1 | Ph | — | — | — | Σ53 | $C_2H_5$ |

TABLE 3-continued $$R^{52}-A^{52}-A^{53}-(X^{52}-A^{54})_{m52}-X^{53}-O-(CO)_{L52}-\underset{*}{\overset{\overset{\displaystyle CH_3}{|}}{CH}}-(COO)_{L53}-R^{53} \quad (V)$$

| No. | R$^{52}$ | A$^{52}$ | A$^{53}$ | X$^{52}$ | A$^{54}$ | X$^{53}$ | Σ5 | R$^{53}$ |
|---|---|---|---|---|---|---|---|---|
| 45 | C$_{18}$H$_{37}$ | Id1 | Ph | — | — | — | Σ51 | C$_6$H$_{13}$ |
| 46 | C$_{11}$H$_{23}$ | Id1 | Ph | — | — | — | Σ51 | C$_5$H$_{11}$ |
| 47 | C$_8$H$_{17}$ | Id1 | Ph | — | — | — | Σ52 | C$_5$H$_{11}$ |
| 48 | C$_5$H$_{11}$ | Id1 | Ph2F | — | — | — | Σ51 | C$_6$H$_{13}$ |
| 49 | C$_6$H$_{13}$ | Tn | Ph | — | — | — | Σ53 | C$_6$H$_{13}$ |
| 50 | C$_4$H$_9$O | Tz2 | Ph | — | — | — | Σ53 | C$_8$H$_{17}$ |
| 51 | C$_{12}$H$_{25}$ | Btb2 | Ph | — | — | — | Σ53 | C$_{10}$H$_{21}$ |
| 52 | C$_6$H$_{13}$O | Btb2 | Ph | — | — | — | Σ51 | C$_6$H$_{13}$ |
| 53 | CH$_2$=CH(CH$_2$)$_3$O | Ep2 | Ph | — | — | — | Σ52 | C$_5$H$_{11}$ |
| 54 | C$_9$H$_{19}$ | Gp2 | Ph | — | — | — | Σ51 | C$_6$H$_{13}$ |
| 55 | C$_5$H$_{11}$ | Np | Ph | — | — | — | Σ53 | C$_6$H$_{13}$ |
| 56 | C$_6$H$_{13}$ | Ph | Ph | — | Ph | — | Σ53 | C$_6$H$_{13}$ |
| 57 | C$_8$H$_{17}$COO | Pr2 | Ph | — | Ph | — | Σ53 | C$_5$H$_{11}$ |
| 58 | C$_3$H$_7$ | Py2 | Ph | — | Ph | — | Σ53 | C$_4$H$_9$ |
| 59 | C$_5$H$_{11}$ | — | Ha2 | —COO— | Ph | — | Σ51 | C$_4$H$_9$ |
| 60 | C$_6$H$_{13}$ | Ph | Py2 | COO | Ph | — | Σ51 | C$_6$H$_{13}$ |
| 61 | C$_9$H$_{19}$ | Ph | Py1 | — | Ph | — | Σ52 | C$_6$H$_{13}$ |
| 62 | C$_{13}$H$_{27}$ | Ph | Cy | — | P3Br | — | Σ53 | C$_5$H$_{11}$ |
| 63 | C$_{10}$H$_{21}$O | Ph | Py1 | — | Ph | — | Σ53 | C$_6$H$_{13}$ |
| 64 | C$_7$H$_{15}$ | Ph | Py2 | OCH$_2$ | Ph | — | Σ53 | C$_5$H$_{11}$ |
| 65 | C$_4$H$_9$ | Ph3TF | Pa | COO | Ph | — | Σ53 | C$_6$H$_{13}$ |
| 66 | CH$_3$ | Hb2 | Ph | — | — | — | Σ53 | C$_8$H$_{17}$ |
| 67 | C$_8$H$_{17}$ | Ph | Tn | — | Ph | — | Σ52 | (CH$_2$)$_3$CH(CH$_3$)$_2$ |
| 68 | C$_2$H$_5$ | Ph | Tz1 | — | Ph2M | — | Σ51 | C$_8$H$_{17}$ |
| 69 | C$_6$H$_{13}$ | — | Ph | COO | Ph | — | Σ51 | C$_8$H$_{17}$ |
| 70 | C$_{10}$H$_{21}$ | Ph | Td | — | Ph | — | Σ51 | (CH$_2$)$_3$CH(CH$_3$)$_2$ |
| 71 | C$_{10}$H$_{21}$ | Ph | Py1 | — | — | — | Σ52 | C$_6$H$_{13}$ |
| 72 | C$_6$H$_{13}$ | Ph | Py1 | — | — | — | Σ53 | C$_4$H$_9$ |
| 73 | C$_6$H$_{13}$OCO | Ph | Py1 | — | — | — | Σ53 | C$_6$H$_{13}$ |
| 74 | C$_7$H$_{15}$ | Ph | Pr2 | — | — | — | Σ53 | C$_5$H$_{11}$ |
| 75 | C$_9$H$_{19}$ | Ph | Pr2 | — | — | — | Σ53 | (CH$_2$)$_3$CH(CH$_3$)$_2$ |
| 76 | C$_7$H$_{15}$ | Ph | Pr2 | — | — | — | Σ51 | C$_6$H$_{13}$ |
| 77 | C$_5$H$_{11}$O | Py2 | Cy | — | — | — | Σ51 | C$_{10}$H$_{21}$ |
| 78 | C$_4$H$_9$ | Ph | Cy | — | — | — | Σ53 | C$_2$H$_5$ |
| 79 | C$_{12}$H$_{25}$ | Ph | Cy | — | — | — | Σ52 | C$_5$H$_{11}$ |
| 80 | C$_6$H$_{13}$C≡C | Ph | Pa | — | — | — | Σ51 | C$_{10}$H$_{21}$ |
| 81 | C$_8$H$_{17}$O | Ph | Pd | — | — | — | Σ52 | C$_6$H$_{13}$ |
| 82 | C$_3$H$_7$ | Ph2Cl | Tn | — | — | — | Σ52 | C$_{10}$H$_{21}$ |
| 83 | C$_4$H$_9$ | Ph | Tn | — | — | — | Σ53 | C$_8$H$_{17}$ |
| 84 | C$_8$H$_{17}$ | Ph | Tz1 | — | — | — | Σ53 | C$_8$H$_{17}$ |
| 85 | C$_4$H$_9$OCH(CH$_3$)COO | Ph | Tz1 | — | — | — | Σ51 | C$_7$H$_{15}$ |
| 86 | C$_6$H$_{13}$ | Ph2F | Td | — | — | — | Σ53 | (CH$_2$)$_3$CH(CH$_3$)C$_6$H$_{13}$ |
| 87 | C$_5$H$_{11}$ | Py2 | Np | — | — | — | Σ51 | C$_9$H$_{19}$ |
| 88 | CH$_3$ | Ph | Np | — | — | — | Σ53 | C$_2$H$_5$ |
| 89 | C$_{11}$H$_{23}$ | Ph | Np | — | — | — | Σ53 | C$_6$H$_{13}$ |
| 90 | C$_5$H$_{11}$ | Py1 | Ep1 | — | — | — | Σ53 | C$_5$H$_{11}$ |
| 91 | C$_8$H$_{17}$OC$_2$H$_4$ | Ph | Ep1 | — | — | — | Σ53 | C$_5$H$_{11}$ |
| 92 | C$_6$H$_{13}$ | Ph | Ep1 | — | — | — | Σ51 | C$_8$H$_{17}$ |
| 93 | C$_9$H$_{19}$ | Py1 | Gp1 | — | — | — | Σ53 | C$_5$H$_{11}$ |
| 94 | C$_8$H$_{17}$ | Ph | Gp1 | — | — | — | Σ53 | C$_6$H$_{13}$ |
| 95 | C$_3$H$_7$COO | Ph | Gp1 | — | — | — | Σ53 | C$_8$H$_{17}$ |
| 96 | C$_4$H$_9$ | Ph | Id1 | — | — | — | Σ51 | C$_8$H$_{17}$ |
| 97 | C$_{12}$H$_{25}$ | Ph | Io1 | — | — | — | Σ53 | C$_6$H$_{13}$ |
| 98 | C$_{10}$H$_{21}$ | Ph | Cm1 | — | — | — | Σ52 | C$_8$H$_{17}$ |
| 99 | C$_6$H$_{13}$ | Ph | Ph | — | — | — | Σ53 | C$_8$H$_{17}$ |
| 100 | C$_3$H$_7$ | Ph | Ph | OCH$_2$ | Py1 | — | Σ53 | C$_2$H$_5$ |
| 101 | C$_4$H$_9$ | Ph2CN | Ph | — | Pr1 | — | Σ51 | C$_{10}$H$_{21}$ |
| 102 | C$_5$H$_{11}$ | Ph | Ph3F | OCH$_2$ | Tz1 | — | Σ53 | C$_6$H$_{13}$ |
| 103 | C$_6$H$_{13}$ | Ph | Ph | — | Tn | — | Σ51 | C$_8$H$_{17}$ |
| 104 | C$_7$H$_{15}$ | Tn | Ph | — | Py1 | — | Σ52 | C$_8$H$_{17}$ |
| 105 | C$_{10}$H$_{21}$ | Ph | Ph | — | Cy1 | — | Σ53 | C$_5$H$_{11}$ |

The above-mentioned optically active compound (b) of the formula (V) is excellent in mesomorphism, spontaneous polarization and a solubility with the fluorine-containing mesomorphic compound (a) due to its particular structure. Further, the compound (b) of the formula (V) has the advantage of effectively controlling a helical pitch or the direction of the helix affecting an alignment characteristic resulting from various structures of a chiral portion readily modified. The above advantages (e.g., a large spontaneous polarization and a control of helical pitch or the direction of helix) can also be realized by using two or more species of the compound (b) of the formula (V).

The optically active compound (b) may particularly preferably be represented by the formula (V) wherein R$^{52}$ is a linear or branched alkyl or alkoxy group having 1–18 carbon atoms; $R^{53}$ is a linear or branched alkyl group having 1–10 carbon atoms; m52 and L52 are 0; $A^{52}$ is

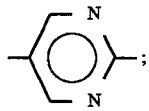

$A^{53}$ is

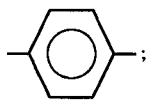

and $X^{53}$ is a single bond or —CO—. Such a compound (b) is effective in allowing a low viscosity and a wide temperature range showing a chiral smectic phase to the resultant liquid crystal composition due to its phenyl-pyrimidine skeleton.

Compound (b) of the formula (VI)

(VI), in which $R^{62}$ and $R^{63}$ independently denote a linear or branched alkyl group having 1–18 carbon atoms and at least one asymmetric carbon atom directly connected with F, $CF_3$ or $CH_3$ and capable of including at least one —$CH_2$— group which can be replaced by wherein $Y^6$ is O or S;

m62 is 0, 1 or 2;

$A^{62}$, $A^{63}$ and $A^{64}$ each may have one or two substituents comprising F, Cl, Br, $CH_3$, $CF_3$ and/or CN and independently denote a single bond; 1,4-phenylene; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl: 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms; and $X^{62}$ and $X^{63}$ independently denote a single bond, —COO—, —OCO—, —$CH_2$O— or —O$CH_2$—.

Examples of the compound (b) of the formula (VI) may include those as described in JP-A Nos. 6-234749. The compound (b) of the formula (VI) may be produced through a process as described in the documents.

Specific and preferred examples of the optically active compound (b) of the formula (VI) may include those represented by the following structural formulae (Ex. Comp. Nos. 6-1 to 6-105 indicated as Nos. 1–105 in Table 4 below) including abbreviations used for the respective groups listed below in addition to those listed for Table 1. In Table 4, the structural formula (Ex. Comp. No. 6-67 indicated as No. 67) has m62 being 2. In the formula (VI), $R^{62}$-corresponds to $R^{62'}$—ψ(any one of $ψ^1$ to $ψ^7$)— and —$R^{63}$ corresponds to —Σ6 (any one of Σ61 to Σ65)—$R^{63'}$ indicated in Table 4.

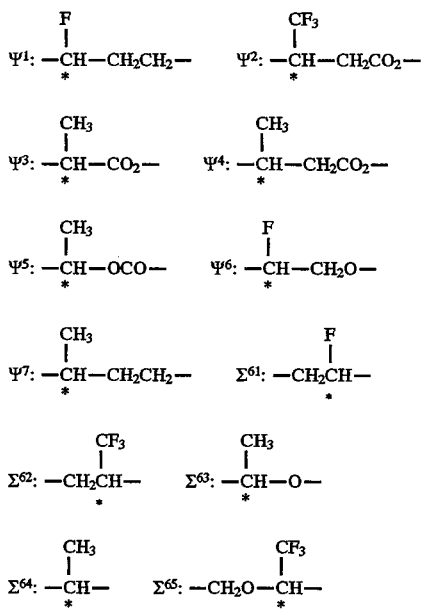

TABLE 4

| | | | | $R^{62}$—($A^{62}$—$X^{62}$)$_{m62}$—$A^{63}$—$A^{64}$—$X^{63}$—$R^{63}$ | | | | | (VI) |
|---|---|---|---|---|---|---|---|---|---|
| No. | $R^{62'}$ | Ψ | $A^{62}$ | $X^{62}$ | $A^{63}$ | $A^{64}$ | $X^{65}$ | Σ6 | $R^{63'}$ |
| 1 | $C_6H_{13}$ | $ψ^1$ | — | — | Ph | Ph | —O— | Σ61 | $C_8H_{17}$ |
| 2 | $C_8H_{17}$O | $ψ^3$ | — | — | Ph | Ph | —COO— | Σ61 | $C_{18}H_{37}$ |
| 3 | $C_5H_{11}$O | $ψ^3$ | — | — | Ph | Ph2F | —O— | Σ61 | $C_6H_{13}$ |
| 4 | $CH_3$O | $ψ^3$ | — | — | Ph | Ph | —O— | Σ61 | $C_6H_{13}$ |
| 5 | $C_6H_{13}CH(CH_3)$ | $ψ^1$ | — | — | Ph | Ph | —COO— | Σ61 | $C_6H_{13}$ |
| 6 | $C_7H_{15}$ | $ψ^2$ | — | — | Ph | Ph23F | —O— | Σ61 | $C_6H_{13}$ |
| 7 | $C_6H_{13}$ | $ψ^1$ | — | — | Ph | Ph | —O— | Σ61 | $C_9H_{19}$ |
| 8 | $C_7H_{15}$O | $ψ^3$ | — | — | Ph | Ph | —O— | Σ61 | $C_5H_{11}$ |
| 9 | $C_8H_{17}$ | $ψ^1$ | — | — | Ph | Ph | —O— | Σ64 | $C_6H_{13}$ |
| 10 | $C_8H_{17}$ | $ψ^4$ | — | — | Pr1 | Ph | —O— | Σ61 | $C_8H_{17}$ |
| 11 | $C_{10}H_{21}$ | $ψ^1$ | — | — | Pr2 | Ph | —O— | Σ61 | $C_4H_9$ |
| 12 | $C_{11}H_{23}$ | $ψ^1$ | — | — | Pr2 | Ph | —O— | Σ61 | $C_6H_{13}$ |
| 13 | $C_{12}H_{25}$ | $ψ^1$ | — | — | Pr2 | Ph | —O— | Σ62 | $C_8H_{17}$ |
| 14 | $C_4H_9$O | $ψ^3$ | — | — | Py1 | Ph | —O— | Σ61 | $C_{10}H_{21}$ |

TABLE 4-continued $$R^{62}-(A^{62}-X^{62})_{m62}-A^{63}-A^{64}-X^{63}-R^{63} \quad (VI)$$

| No. | $R^{62'}$ | Ψ | $A^{62}$ | $X^{62}$ | $A^{63}$ | $A^{64}$ | $X^{65}$ | Σ6 | $R^{63'}$ |
|---|---|---|---|---|---|---|---|---|---|
| 15 | $C_6H_{13}$ | $\Psi^1$ | — | — | Py2 | Ph | —O— | Σ61 | $C_8H_{17}$ |
| 16 | $C_6H_{13}$ | $\Psi^1$ | — | — | Py2 | Ph | —OCO— | Σ61 | $C_8H_{17}$ |
| 17 | $C_6H_{13}CH(CH_3)CH_2O$ | $\Psi^4$ | — | — | Py2 | Ph | —OCO— | Σ61 | $C_9H_{19}$ |
| 18 | $C_5H_{11}$ | $\Psi^1$ | — | — | Py2 | Ph23F | —OCO— | Σ63 | $C_4H_9$ |
| 19 | $C_2H_5$ | $\Psi^7$ | — | — | Py2 | Ph | —O— | Σ61 | $C_6H_{13}$ |
| 20 | $C_8H_{17}$ | $\Psi^2$ | — | — | Py2 | Ph3F | —COO— | Σ64 | $C_8H_{17}$ |
| 21 | $C_6H_{13}$ | $\Psi^1$ | — | — | Cy | Ph | —O— | Σ61 | $C_4H_9$ |
| 22 | $C_3H_7$ | $\Psi^1$ | — | — | Cy | Ph | —COO— | Σ62 | $C_5H_{11}$ |
| 23 | $C_5H_{11}$ | $\Psi^2$ | — | — | Cy | Ph | —O— | Σ61 | $C_{14}H_{29}$ |
| 24 | $C_{10}H_{21}$ | $\Psi^2$ | — | — | Cy | Ph | —O— | Σ61 | $C_{10}H_{21}$ |
| 25 | $C_6H_{13}$ | $\Psi^1$ | — | — | Pa | Ph | —O— | Σ62 | $C_{10}H_{21}$ |
| 26 | $C_7H_{15}OCO$ | $\Psi^5$ | — | — | Pd | Ph | —O— | Σ61 | $C_3H_7$ |
| 27 | $C_6H_{13}$ | $\Psi^1$ | — | — | Dt2 | Ph | —O— | Σ61 | $C_6H_{13}$ |
| 28 | $C_8H_{17}$ | $\Psi^1$ | — | — | Tn | Ph | —O— | Σ61 | $C_9H_{19}$ |
| 29 | $C_5H_{11}$ | $\Psi^2$ | — | — | Tz1 | Ph | —O— | Σ61 | $C_9H_{19}$ |
| 30 | $C_9H_{19}O$ | $\Psi^3$ | — | — | Tz2 | Ph | —COO— | Σ61 | $C_6H_{13}$ |
| 31 | $C_2H_5$ | $\Psi^1$ | — | — | Td | Ph | —O— | Σ61 | $C_7H_{15}$ |
| 32 | $C_{10}H_{21}$ | $\Psi^2$ | — | — | Dx2 | Ph | —OCO— | Σ63 | $C_8H_{17}$ |
| 33 | $C_6H_{13}$ | $\Psi^1$ | — | — | Boa2 | Ph | —O— | Σ61 | $C_{10}H_{21}$ |
| 34 | $C_{15}H_{31}$ | $\Psi^1$ | — | — | Bob2 | Ph | —O— | Σ61 | $C_{10}H_{21}$ |
| 35 | $C_7H_{15}$ | $\Psi^1$ | — | — | Bta2 | Ph | —O— | Σ61 | $C_6H_{13}$ |
| 36 | $C_6H_{13}$ | $\Psi^6$ | — | — | Btb2 | Ph | — | Σ65 | $C_6H_{13}$ |
| 37 | $C_6H_{13}$ | $\Psi^1$ | — | — | Np | Ph | —O— | Σ61 | $C_6H_{13}$ |
| 38 | $C_5H_{11}$ | $\Psi^1$ | — | — | Np | Ph | —COO— | Σ61 | $C_4H_9$ |
| 39 | $C_8H_{17}CH(CH_3)CH_2$ | $\Psi^2$ | — | — | Ep1 | Ph | —O— | Σ61 | $C_6H_{13}$ |
| 40 | $C_4H_9$ | $\Psi^1$ | — | — | Ep2 | Ph | —O— | Σ61 | $C_8H_{17}$ |
| 41 | $C_6H_{13}$ | $\Psi^2$ | — | — | Gp1 | Ph | —O— | Σ61 | $C_8H_{17}$ |
| 42 | $C_7H_{15}$ | $\Psi^1$ | — | — | Gp2 | Ph | —O— | Σ61 | $C_{12}H_{25}$ |
| 43 | $C_6H_{13}$ | $\Psi^1$ | — | — | Cm1 | Ph | —O— | Σ61 | $C_{10}H_{21}$ |
| 44 | $C_8H_{17}$ | $\Psi^1$ | — | — | Io1 | Ph | —O— | Σ61 | $C_{12}H_{25}$ |
| 45 | $C_{12}H_{25}$ | $\Psi^1$ | — | — | Id1 | Ph | —COO— | Σ61 | $C_6H_{13}$ |
| 46 | $C_{11}H_{23}$ | $\Psi^1$ | — | — | Id1 | Ph | —OCO— | Σ63 | $C_5H_{11}$ |
| 47 | $C_8H_{17}$ | $\Psi^1$ | — | — | Id1 | Ph | —O— | Σ61 | $C_5H_{11}$ |
| 48 | $C_5H_{11}$ | $\Psi^2$ | — | — | Id1 | Ph2F | —COO— | Σ61 | $C_6H_{13}$ |
| 49 | $C_6H_{13}$ | $\Psi^1$ | — | — | Tn | Ph | —COO— | Σ64 | $C_6H_{13}$ |
| 50 | $C_4H_9O$ | $\Psi^3$ | — | — | Tz2 | Ph | —O— | Σ61 | $C_8H_{17}$ |
| 51 | $C_{12}H_{25}$ | $\Psi^1$ | — | — | Btb2 | Ph | —O— | Σ62 | $C_{10}H_{21}$ |
| 52 | $C_6H_{13}O$ | $\Psi^1$ | — | — | Btb2 | Ph | —O— | Σ62 | $C_6H_{13}$ |
| 53 | $CH_2=CH(CH_2)_3O$ | $\Psi^3$ | — | — | Ep2 | Ph | —O— | Σ61 | $C_5H_{11}$ |
| 54 | $C_9H_{19}$ | $\Psi^4$ | — | — | Gp2 | Ph | —O— | Σ61 | $C_6H_{13}$ |
| 55 | $C_5H_{11}$ | $\Psi^4$ | — | — | Np | Ph | —O— | Σ61 | $C_6H_{13}$ |
| 56 | $C_6H_{13}$ | $\Psi^1$ | Ph | OCO | Ph | Ph | —O— | Σ62 | $C_6H_{13}$ |
| 57 | $C_8H_{17}COO$ | $\Psi^2$ | Pr2 | — | Ph | Ph | —COO— | Σ61 | $C_5H_{11}$ |
| 58 | $C_3H_7$ | $\Psi^1$ | Py2 | — | Ph | Ph | —COO— | Σ64 | $C_4H_9$ |
| 59 | $C_5H_{11}$ | $\Psi^1$ | — | — | Ha2 | Ph | —OCO— | Σ63 | $C_4H_9$ |
| 60 | $C_6H_{13}$ | $\Psi^1$ | Ph | COO | Pr2 | Ph | —O— | Σ61 | $C_6H_{13}$ |
| 61 | $C_9H_{19}$ | $\Psi^1$ | Ph | — | Pr1 | Ph | —O— | Σ61 | $C_6H_{13}$ |
| 62 | $C_{13}H_{27}$ | $\Psi^1$ | Ph | — | Cy | Ph3Br | —O— | Σ61 | $C_5H_{11}$ |
| 63 | $C_{10}H_{21}O$ | $\Psi^1$ | Ph | COO | Py1 | Ph | —O— | Σ61 | $C_6H_{13}$ |
| 64 | $C_7H_{15}$ | $\Psi^2$ | Ph | COO | Py2 | Ph | —O— | Σ61 | $C_5H_{11}$ |
| 65 | $C_4H_9$ | $\Psi^1$ | Ph3T | COO | Pa | Ph | —O— | Σ61 | $C_6H_{13}$ |
| 66 | $CH_3$ | $\Psi^1$ | — | — | Hb2 | Ph | —O— | Σ62 | $C_8H_{17}$ |
| 67 | $C_8H_{17}$ | $\Psi^1$ | Ph | COO | Tn | Ph | —O— | Σ62 | $(CH_2)_3CH(CH_3)_2$ |
| 68 | $C_2H_5$ | $\Psi^1$ | Ph | — | Tz1 | Ph2M | —O— | Σ61 | $C_8H_{17}$ |
| 69 | $C_6H_{13}$ | $\Psi^2$ | Ph | COO | Ph | — | —O— | Σ61 | $C_8H_{17}$ |
| 70 | $C_{10}H_{21}$ | $\Psi^1$ | Ph | — | Td | Ph | —O— | Σ61 | $(CH_2)_3CH(CH_3)_2$ |
| 71 | $C_{10}H_{21}$ | $\Psi^1$ | — | — | Ph | Py1 | —O— | Σ61 | $C_6H_{13}$ |
| 72 | $C_6H_{13}$ | $\Psi^1$ | — | — | Ph | Py1 | —O— | Σ61 | $C_4H_9$ |
| 73 | $C_6H_{13}OCO$ | $\Psi^5$ | — | — | Ph | Py1 | —O— | Σ61 | $C_6H_{13}$ |
| 74 | $C_7H_{15}$ | $\Psi^4$ | — | — | Ph | Pr2 | —O— | Σ61 | $C_5H_{11}$ |
| 75 | $C_9H_{19}$ | $\Psi^1$ | — | — | Ph | Pr2 | —O— | Σ61 | $(CH_2)_3CH(CH_3)_2$ |
| 76 | $C_7H_{15}$ | $\Psi^1$ | — | — | Ph | Pr2 | —O— | Σ61 | $C_6H_{13}$ |
| 77 | $C_5H_{11}O$ | $\Psi^3$ | — | — | Py2 | Cy | —COO— | Σ61 | $C_{10}H_{21}$ |
| 78 | $C_4H_9$ | $\Psi^1$ | — | — | Ph | Cy | —OCO— | Σ62 | $C_{12}H_{25}$ |
| 79 | $C_{12}H_{25}$ | $\Psi^1$ | — | — | Ph | Cy | —O— | Σ61 | $C_5H_{11}$ |
| 80 | $C_6H_{13}C\equiv C$ | $\Psi^2$ | — | — | Ph | Pa | —COO— | Σ61 | $C_{10}H_{21}$ |
| 81 | $C_8H_{17}O$ | $\Psi^3$ | — | — | Ph | Pd | —COO— | Σ62 | $C_6H_{13}$ |
| 82 | $C_3H_7$ | $\Psi^1$ | — | — | Ph2Cl | Tn | —O— | Σ61 | $C_{10}H_{21}$ |
| 83 | $C_4H_9$ | $\Psi^1$ | — | — | Ph | Tn | —O— | Σ62 | $C_8H_{17}$ |
| 84 | $C_8H_{17}$ | $\Psi^2$ | — | — | Ph | Tz1 | —O— | Σ61 | $C_8H_{17}$ |
| 85 | $C_4H_9OCH(CH_3)COO$ | $\Psi^3$ | — | — | Ph | Tz1 | —O— | Σ61 | $C_7H_{15}$ |
| 86 | $C_6H_{13}$ | $\Psi^1$ | — | — | Ph2F | Td | —O— | Σ64 | $(CH_2)_3CH(CH_3)C_6H_{13}$ |
| 87 | $C_5H_{11}$ | $\Psi^1$ | — | — | Py2 | Np | —COO— | Σ61 | $C_9H_{19}$ |
| 88 | $CH_3$ | $\Psi^2$ | — | — | Ph | Np | —COO— | Σ64 | $C_{12}H_{25}$ |
| 89 | $C_{11}H_{23}$ | $\Psi^1$ | — | — | Ph | Np | —O— | Σ62 | $C_6H_{13}$ |

TABLE 4-continued $$R^{62}-(A^{62}-X^{62})_{m62}-A^{63}-A^{64}-X^{63}-R^{63} \quad (VI)$$

| No. | $R^{62'}$ | $\Psi$ | $A^{62}$ | $X^{62}$ | $A^{63}$ | $A^{64}$ | $X^{65}$ | $\Sigma 6$ | $R^{63'}$ |
|---|---|---|---|---|---|---|---|---|---|
| 90 | $C_5H_{11}$ | $\Psi^1$ | — | — | Py1 | Ep1 | —O— | $\Sigma 61$ | $C_5H_{11}$ |
| 91 | $C_8H_{17}OC_2H_4$ | $\Psi^1$ | — | — | Ph | Ep1 | —O— | $\Sigma 62$ | $C_5H_{11}$ |
| 92 | $C_6H_{13}$ | $\Psi^1$ | — | — | Ph | Ep1 | —OCO— | $\Sigma 61$ | $C_8H_{17}$ |
| 93 | $C_9H_{19}$ | $\Psi^1$ | — | — | Py1 | Gp1 | —O— | $\Sigma 64$ | $COOC_5H_{11}$ |
| 94 | $C_8H_{17}$ | $\Psi^1$ | — | — | Ph | Gp1 | —OCO— | $\Sigma 63$ | $C_6H_{13}$ |
| 95 | $C_3H_7COO$ | $\Psi^3$ | — | — | Ph | Gp1 | —O— | $\Sigma 61$ | $C_8H_{17}$ |
| 96 | $C_4H_9$ | $\Psi^1$ | — | — | Ph | Id1 | —O— | $\Sigma 61$ | $C_8H_{17}$ |
| 97 | $C_{12}H_{25}$ | $\Psi^1$ | — | — | Ph | Io1 | —O— | $\Sigma 61$ | $C_6H_{13}$ |
| 98 | $C_{10}H_{21}$ | $\Psi^1$ | — | — | Ph | Cm1 | —O— | $\Sigma 61$ | $C_8H_{17}$ |
| 99 | $C_6H_{13}$ | $\Psi^1$ | — | — | Ph | Ph | —O— | $\Sigma 64$ | $C_8H_{17}$ |
| 100 | $C_3H_7$ | $\Psi^1$ | Ph | $OCH_2$ | Ph | Py1 | —O— | $\Sigma 63$ | $C_{12}H_{25}$ |
| 101 | $C_4H_9$ | $\Psi^1$ | Ph2CN | COO | Ph | Pr1 | —O— | $\Sigma 61$ | $C_{10}H_{21}$ |
| 102 | $C_5H_{11}$ | $\Psi^2$ | Ph | $CH_2O$ | Ph3F | Tz1 | —O— | $\Sigma 61$ | $C_6H_{13}$ |
| 103 | $C_6H_{13}$ | $\Psi^2$ | Ph | — | Ph | Tn | —O— | $\Sigma 62$ | $C_8H_{17}$ |
| 104 | $C_7H_{15}$ | $\Psi^1$ | Tn | — | Ph | Py1 | —O— | $\Sigma 61$ | $C_8H_{17}$ |
| 105 | $C_{10}H_{21}$ | $\Psi^2$ | Ph | — | Ph | Cy1 | —O— | $\Sigma 61$ | $C_5H_{11}$ |

$R^{63}$ in the formula (VI) may preferably be represented by the following formula:

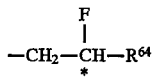

in which $R^{64}$ is a linear or branched alkyl group having 1–16 carbon atoms in view of improvements in spontaneous polarization, viscosity and mutual solubility due to a chiral fluorine portion (—C*H(F)—).

Similarly, $R^{62}$ in the formula (VI) may preferably be represented by the following formula:

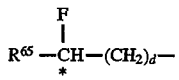

in which $R^{65}$ is a linear or branched alkyl group having 1–16 carbon atoms, and d is an integer of 1–6 in view of improvements in properties as described in the case of $R^{63}$.

The optically active compound (b) may particularly preferably be represented by the formula (VI) wherein m62 is 0; $A^{63}$ is

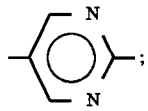

and $A^{64}$ is

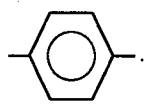

Such a compound (b) is effective in allowing a low viscosity, a mutual solubility of the respective components and a wide temperature range showing a chiral smectic phase to the resultant liquid crystal composition due to its phenyl-pyrimidine skeleton.

The optically active compound (b) of the formula (VI) is used as a so-called double chiral-type chiral dopant having two chiral centers (which provide a spontaneous polarization) each located in an inner portion of a terminal group, i.e., located on the both sides of a central core portion. When the double chiral-type chiral dopant (the compound (b) of the formula (VI)) is used together with the compound (a) having a terminal perfluoroether group or a terminal perfluoroalkyl group effective in providing a bookshelf structure or a structure having a small layer inclination angle closer thereto, the resultant liquid crystal composition shows a good mutual solubility and a large spontaneous polarization to attain good driving characteristics.

The (chiral smectic) liquid crystal composition according to the present invention may be obtained by mixing at least one spaces of the fluorine-containing mesomorphic compound (a) (preferably having the formula (I) or (I') with at least one species of the optically active compound (b) of the formula (II) (preferably of any one of the formulae (III) to (VI)) in an appropriate proportions. The optically active compound (b) of any one of the formulae (II) to (VI) may generally be contained in the liquid crystal composition in an amount of trace to below 50 wt. %, preferably 2–40 wt. %. The optically active compound (b) may also be contained in the liquid crystal composition in a very small amount (e.g., $1 \times 10^{-5}$ wt. %) so long as it functions as a chiral dopant. If the addition amount of the optically active compound (b) is at least 50 wt. %, the resultant liquid crystal composition shows a high viscosity and a narrow chiral smectic temperature range in some cases.

The (chiral smectic) liquid crystal composition of the invention may further contain at least one species of another mesomorphic compound and/or another chiral dopant each different from those described above and also contain additives such as an antioxidant, an ultraviolet ray-absorbing agent, a colorant and a pigment.

Examples of another mesomorphic compound may include those as described in Demus et al., Flüssige Kristalle in Tabellen II (VEB Deutschev Verlag fur Grundstoffindustrie, Liepzig, 1984).

The liquid crystal device according to the present invention may preferably be a (chiral smectic) liquid crystal device using the above-mentioned chiral smectic liquid crystal composition.

Hereinbelow, an embodiment of the liquid crystal device of the present invention will be explained with reference to FIG. 1.

FIG. 1 is a schematic sectional view of an embodiment of the liquid crystal device for explanation of the structure thereof.

Referring to FIG. 1, the liquid crystal device includes a liquid crystal layer 1 comprising a chiral smectic liquid crystal composition disposed between a pair of substrates 2 each having thereon a transparent electrode 3 and an alignment control layer 4. In the present invention, the transparent electrode 3 and/or the alignment control layer may be formed on one of the substrates 2. The substrates 2 are placed or arranged opposite to each other. The periphery of the substrates 2 is sealed up with a sealing agent 5. Outside the thus treated substrates 2, a pair of polarizers 6 are disposed so as to modulate incident light $I_O$ from a light source 7 in cooperation with the liquid crystal 1 to provide modulated light L. The liquid crystal device can be driven by controlling (or switching) the alignment (or orientation) direction of liquid crystal molecules in accordance with image data based on a switching signal from a signal power supply (not shown), thus effecting display. Accordingly, the liquid crystal device functions as a display device. Further, in case where two transparent electrodes 3 are arranged in matrix on the pair of substrates, it is possible to perform pattern display and pattern exposure, so that the liquid crystal device is used as a display device for a personal computer, a word processor, etc., or as a light valve for a printer.

The liquid crystal layer 1 may preferably have a thickness of at most 5 μm in order to exhibit bistability. The liquid crystal layer 1 may be constituted by a lot of smectic liquid crystal molecular layers forming a bookshelf structure or a closer structure thereto having a small layer inclination angle. Each of two substrates 2 comprises glass or plastic and is coated with a transparent electrode 3 comprising a film of $SnO_2$, $In_2O_3$, $SnO_2$ or ITO (indium-tin-oxide) to form an electrode plate. Further thereon, the alignment control layer 4 is formed by applying a solution containing a material for the alignment control layer or by vapor deposition or sputtering of a material for the alignment control layer. Examples of the material for the alignment control layer 4 may include: an inorganic material, such as silicon monoxide, silicon dioxide, aluminum oxide, zirconium oxide, magnesium fluoride, cerium oxide, cerium fluoride, silicon nitride, silicon carbide, or boron nitride; and an organic material, such as polyvinyl alcohol, polyimide, polyamide-imide, polyester, polyamide, polyester-imide, polyparaxylylene, polycarbonate, polyvinyl acetal, polyvinyl chloride, polystyrene, cellulose resin, melamine resin, urea resin or acrylic resin. The surface of the thus prepared alignment control layer 4 may be subjected to uniaxial alignment treatment, as desired, e.g., by rubbing the surface thereof with a fibrous material such as velvet, cloth or paper. The uniaxial alignment treatment (rubbing treatment) may be performed to one of the alignment control films 4 so as to effectively control an alignment state of liquid crystal molecules. The alignment control layer 4 may be formed by an oblique vapor deposition method wherein a film of an oxide such as $SiO_2$ or a nitride is vapor-deposited on the electrode plate(s) from the oblique direction to the electrode plate. The liquid crystal device of the invention may further comprise a short circuit-preventing layer for the pair of substrates, such as an insulating layer, an inorganic material layer and an organic material layer other than those for the above-mentioned alignment control layer, if necessary.

In view of ease of formation and a high alignment control ability, the alignment control layer 4 may preferably comprise a polyimide film or a polyamide film, e.g., formed by applying a polyimide precursor solution or a polyamic acid solution and curing the solution, followed by uniaxial alignment treatment, particularly rubbing treatment of the resultant film. Examples of a polyimide and a polyamide used for forming the alignment control layer 4 may preferably include those having a molecular structure with a high rigidity, a high linear property and a high crystallinity in order to uniformly align the chiral smectic liquid crystal composition. Such a polyimide and polyamide may preferably be represented by the following formula (VII) and formula (VIII), respectively.

Formula (VII)

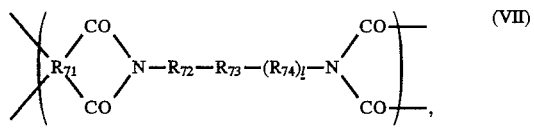

in which $R_{71}$ is

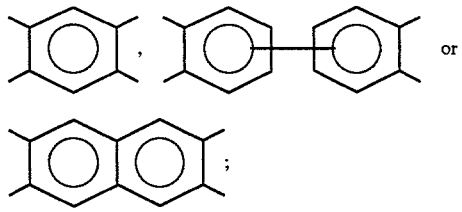

$R_{72}$ and $R_{74}$ independently denote

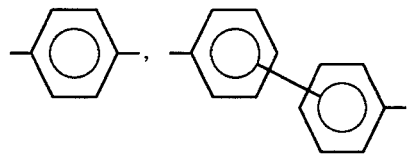

or

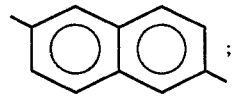

$R_{73}$ is a single bond or —O—; and 1 is 0, 1 or 2.

Formula (VIII)

in which $R_{81}$ is an alkylene group having 1–20 carbon atoms,

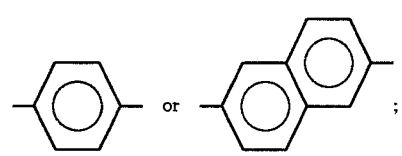

$R_{82}$ and $R_{86}$ are independently —CONH— or —NHCO—;

$R_{83}$ and $R_{85}$ are independently
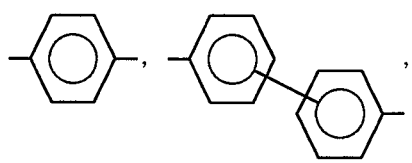
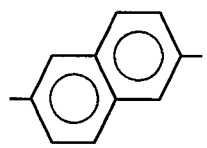
or an alkylene group having 1–20 carbon atoms:
$R_{84}$ is a single bond or —O—; and
r8 is 0, 1 or 2.
Specific examples of the polyimide of the formula (VII) and the polyamide of the formula (VIII) may include those having the following recurring units shown below.
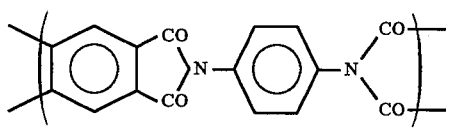
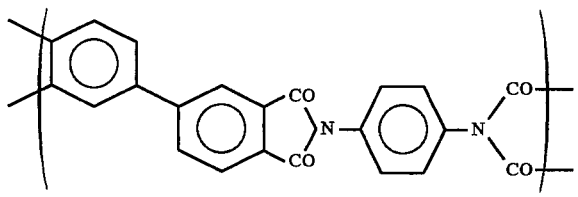
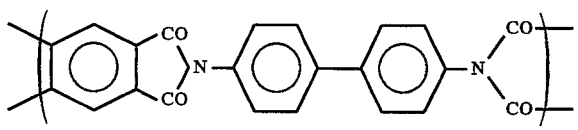
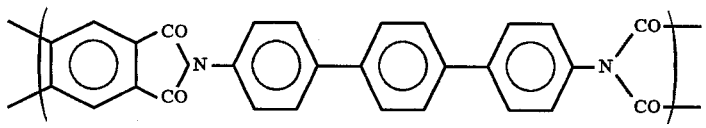
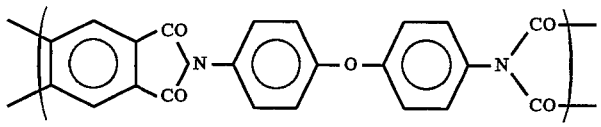
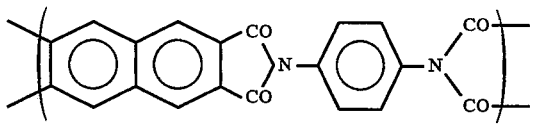
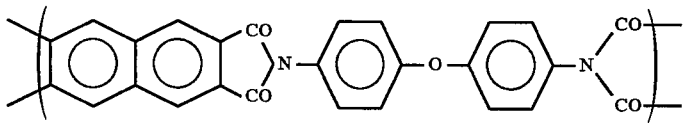
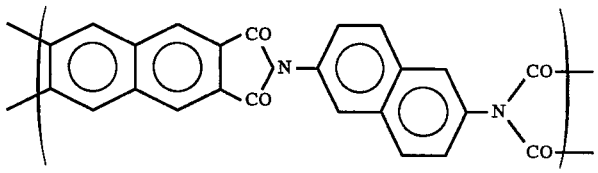

-continued

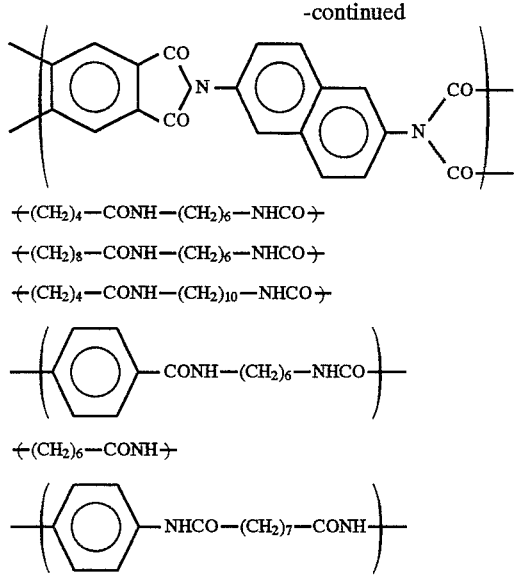

$-(-(CH_2)_4-CONH-(CH_2)_6-NHCO-)-$ $-(-(CH_2)_8-CONH-(CH_2)_6-NHCO-)-$ $-(-(CH_2)_4-CONH-(CH_2)_{10}-NHCO-)-$ $-(-\text{C}_6\text{H}_4-CONH-(CH_2)_6-NHCO-)-$ $-(-(CH_2)_6-CONH-)-$ $-(-\text{C}_6\text{H}_4-NHCO-(CH_2)_7-CONH-)-$ In the present invention, one of the alignment control layers formed on one substrate may comprise a material therefor which is different from that for the other alignment control layer in order to improve an alignment characteristic in the case of providing a bookshelf structure.

The liquid crystal device of the present invention may be arranged in various modes or forms as long as it uses a liquid crystal composition containing the fluorine-containing mesomorphic compound (a) and the optically active compound (b) as essential components thereby to impart required functions.

In the present invention, it is possible to effect a display with better performances, such as a high contrast ratio, a high brightness, a large display area and a high definition by using the liquid crystal composition or the liquid crystal device as mentioned above. According to an embodiment of the display method according to the present invention, it is possible to effect a binary display (black and white (or dark and bright)) each at one pixel by sandwiching a liquid crystal cell (i.e., the liquid crystal device before a pair of polarizer is disposed) between a pair of polarizer so as to provide one of bistable states showing the darkest state and then applying an electric field to find a position so as to provide the other of bistable states showing a bright state. It is also possible to effect a multiple display (or gradational display) by using a method wherein plural times of a binary (bright-dark) display are performed at a prescribed interval within a certain period of time or a method wherein a part of one pixel is subjected to switching.

The liquid crystal device according to the present invention can be used as an active element, particularly an active display element, for various liquid crystal apparatus, one embodiment of which is described below.

Figure 2:
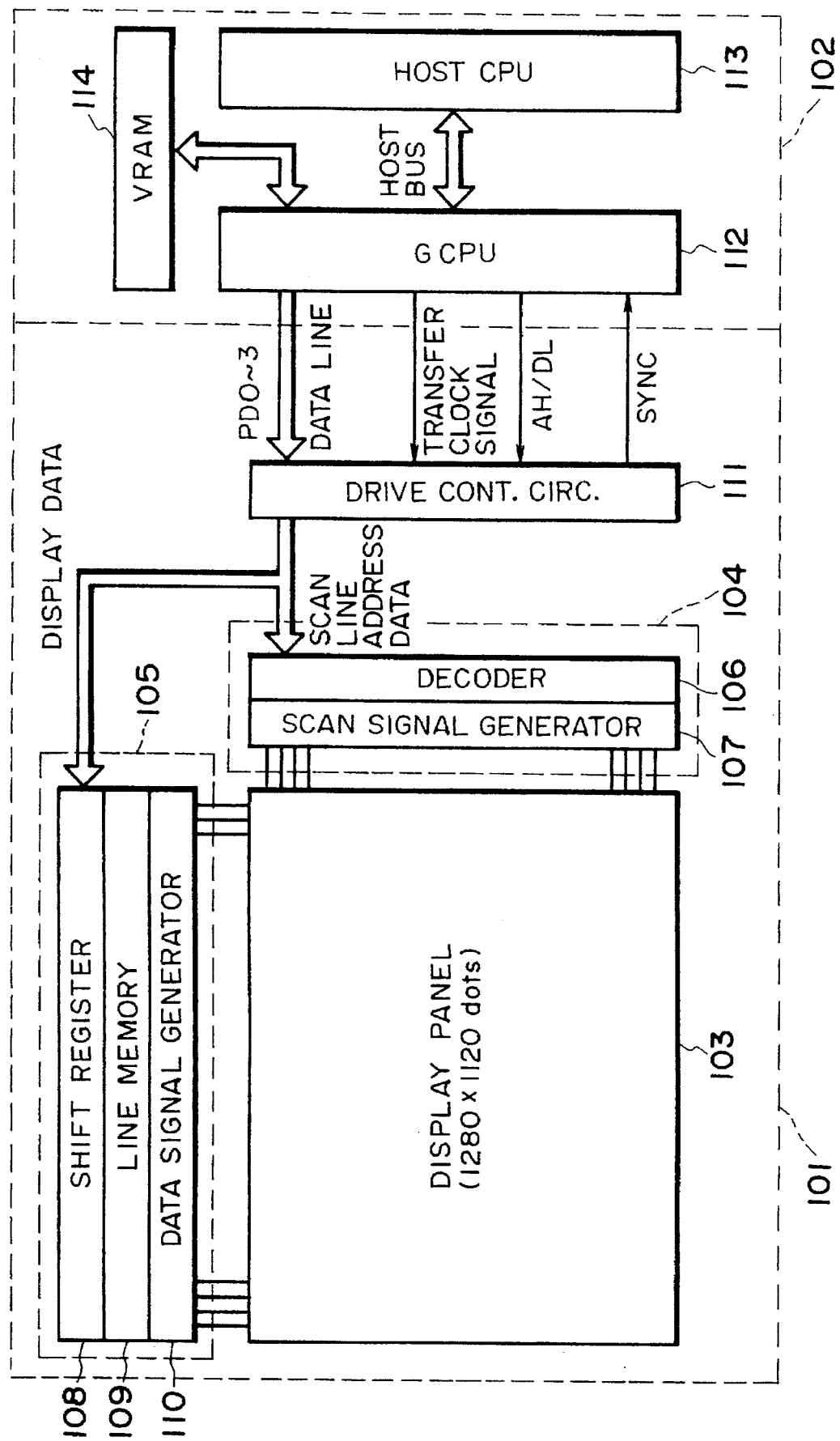
FIG. 2 is a block diagram showing a display apparatus comprising a liquid crystal device utilizing a liquid crystal composition and a graphic controller according to the present invention.
Figure 3:
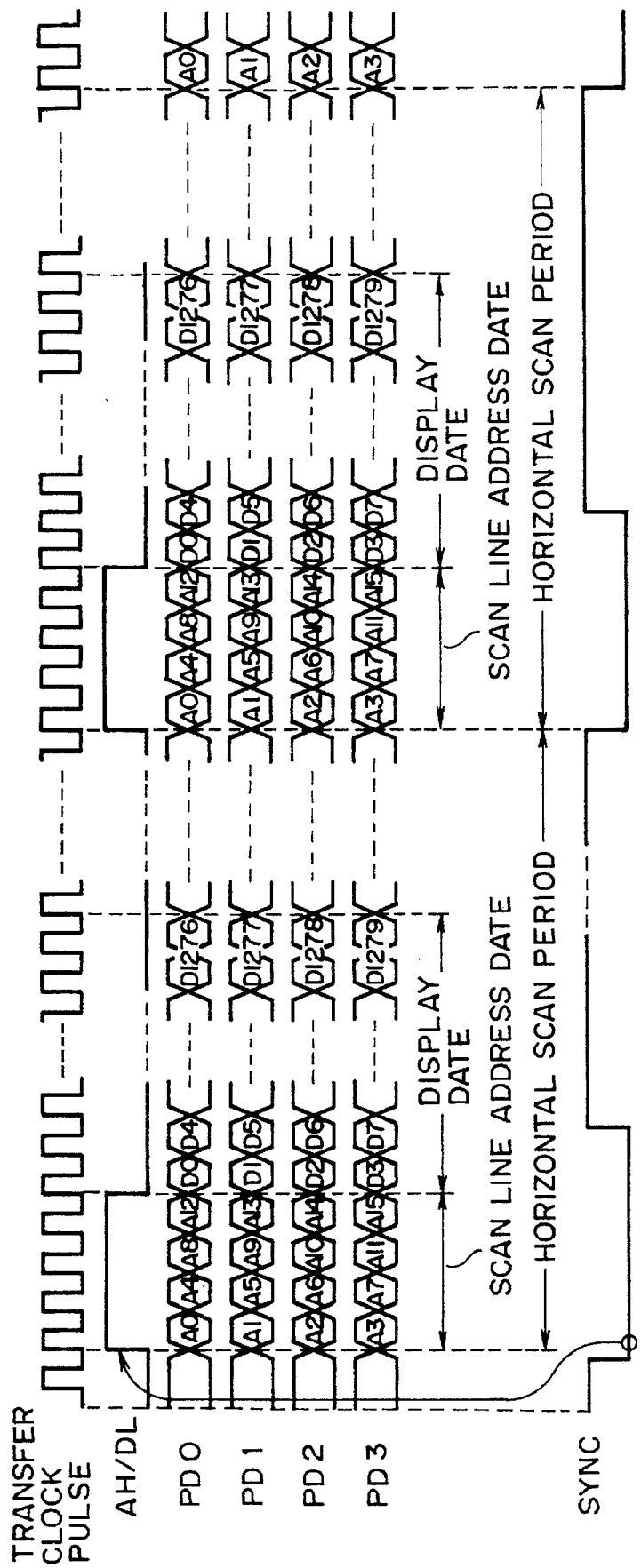
FIG. 3 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 2 and 3, there is provided a liquid crystal display apparatus of the present invention which uses the liquid crystal device according to the present invention as a display panel portion.

Referring to FIG. 2, a liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally performed by the graphic controller 102. A light source (not shown) is disposed at the back of the display panel 103.

Hereinbelow, the present invention will be explained more specifically with reference to examples. It is however to be understood that the present invention is not restricted to these examples.

EXAMPLE 1

Three chiral smectic liquid crystal compositions (1), (2) and (3) were prepared by mixing the following compounds (having the indicated structural formulae and phase transition temperatures (° C.))) in the proportions indicated below.

$A/B_1/B_2/B_3/C_1 = 50/15/10/15/10$ (wt. %) ($C_1$: $C_1$-1 for Composition (1), $C_1$-2 for Composition (2) and $C_1$—3 for Composition (3))

Compound (a)

A: 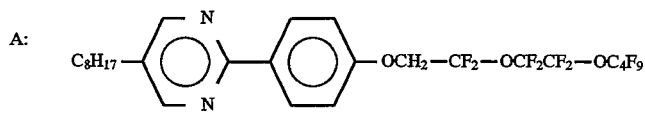

Phase transition (°C.)

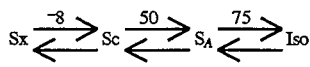

B₁: 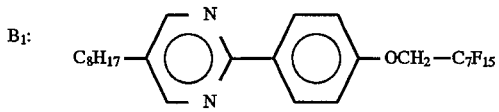

Phase transition (°C.)

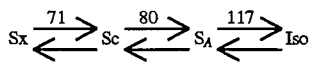

B₂: 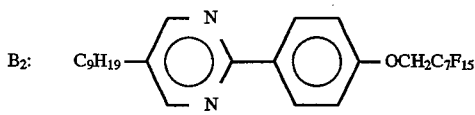

Phase transition (°C.)

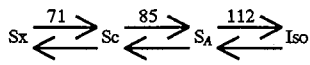

B₃: 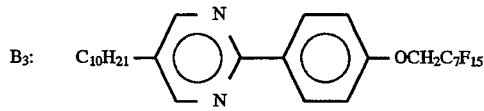

Phase transition (°C.)

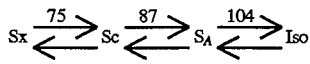

Compound (b)

C₁ (chiral dopant)

C₁-1: 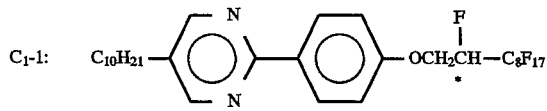

C₁-2: 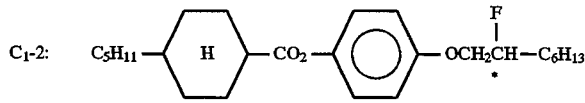

C₁-3: 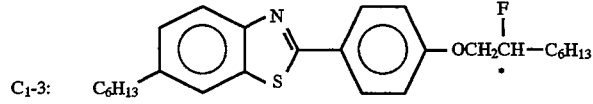

In the above phase transition series, Sx denotes a smectic phase (unidentified); Sc denotes a smectic C phase; $S_A$ denotes a smectic A phase; and Iso denotes an isotropic phase.

Each of liquid crystal cells was prepared as follows.

To one glass plate provided with an ITO film, a solution of a polyimide precursor (providing a polyimide having a recurring unit of the formula shown below) in a mixture solvent (n-methylpirrolidone (NMP)/n-butylcellosolve (nBC)=2/1) was applied by spin coating. The thus coated glass plate was subjected to hot curing treatment and a rubbing treatment.

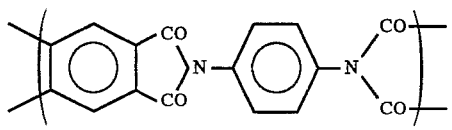

To another glass plate provided with an ITO film, a solution of a silane coupling agent comprising octadecyltriethoxysilane was applied by spin coating, followed by hot curing.

After silica beads as a spacer were dispersed on one of the above-treated two glass plates, the two glass plates were applied to each other to form a blank cell having a cell gap of 1.8 μm.

Into the thus-prepared liquid crystal cells, the above-prepared liquid crystal compositions (1) to (3) heated into an isotropic liquid were injected, respectively, by a capillary method. Each of the liquid crystal cells was then gradually cooled to room temperature to prepare a liquid crystal device according to the present invention.

Each of the thus-prepared liquid crystal devices using the liquid crystal compositions (1) to (3), respectively, was subjected to measurement of an apparent tilt angle θa, a contrast ratio and a threshold value (for switching). The results are shown in Table 5 appearing hereinafter.

TABLE 5

| Composition No. | Chiral dopant | θa (degrees) | Contrast | (at 40° C.) Threshold value (μsec) |
|---|---|---|---|---|
| (1) | $C_1$-1 | 21.4 | 35 | 62 |
| (2) | $C_1$-2 | 18.9 | 32 | 60 |
| (3) | $C_1$-3 | 19.9 | 31 | 49 |

Herein, the respective characteristics were evaluated or measured as follows.

Apparent tilt angle θa (A half of an angle between optical axes in two stable states (memory state))

An liquid crystal device sandwiched between right angle cross nicol polarizes was supplied with a single pulse of one polarity exceeding the threshold voltage of the liquid crystal and was then rotated under no electric field horizontally relative to the polarizers to find a first extinction position. Then, the liquid crystal device was supplied with a single pulse of the opposite polarity exceeding the threshold voltage of the ferroelectric liquid crystal and was then rotated under no electric field relative to the polarizers to find a second extinct position. An apparent tilt angle θa was measured as a half of the angle between the first and second extinct positions.

Contrast ratio

Figure 4:
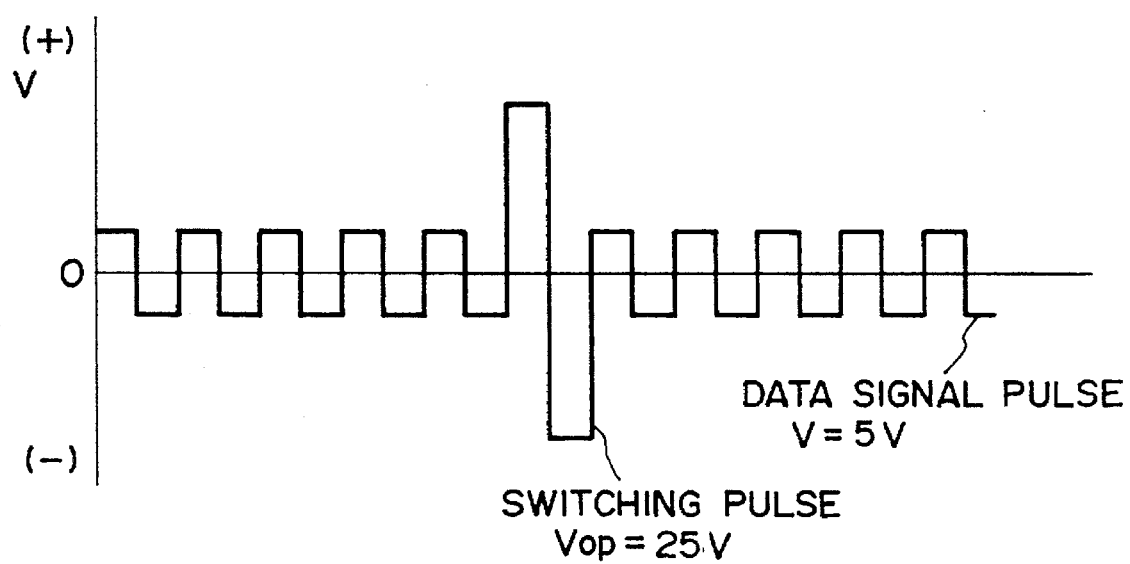
FIG. 4 is a view showing a switching signal used in driving conditions adopted in Examples appearing hereinafter.

The contrast ratio was measured by fixing a stage providing the darkest optical axis by means of a photomultiplier (available from Hamamatsu Photonics K.K.) under observation through a polarizing microscope and under application of a rectangular pulse having a switching signal waveform (voltage: ±5 V, pulse width: 1.2 times that of a threshold pulse width) shown in FIG. 4, thereby to find an output value for a dark (black) state and an output value for a bright (white) state. The contrast ratio was determined by dividing the output value for the white state by the output value for the black state.

Threshold value

The threshold value was determined by using a switching signal shown in FIG. 4 and gradually changing a pulse width to find a minimum pulse width (μsec) for effecting switching.

Layer inclination angle δ

The layer inclination angle δ was measured according to a method described in Jpn. J. Appl. Phys. 27, p. L725 (1988).

EXAMPLE 2

A liquid crystal composition (4) was prepared in the same manner as in Example 1 except that the respective components were mixed in the following proportions. Composition (4):

$A/B_1/B_2/B_3/C_1$-1=1 80/3/3/4/10 (wt. %)

The liquid crystal composition was evaluated in the same manner as in Example 1 except for further measuring a layer inclination angle δ.

The results are shown below.

θa: 22.3 degrees,

Threshold value: 48 μsec,

Contrast: 52, and

δ=2 degrees.

REFERENCE EXAMPLE 1

A liquid crystal composition (5) was prepared and evaluated in the same manner as in the case of the liquid crystal composition (1) used in Example 1 except that the chiral dopant $C_1$-1 was changed to the following chiral dopant.

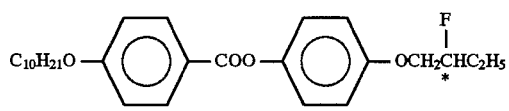

The results are shown below.

θa: 17 degrees.

Threshold value: A clear threshold value was not obtained although a pulse width was increased to 5 msec.

Contrast: 8.3 at a pulse width of 100 sec.

REFERENCE EXAMPLE 2

A liquid crystal composition (6) was prepared in the same manner as in the case of the liquid crystal composition (1) used in Example 1 except that the chiral dopant $C_1$-1 was changed to the following chiral dopant.

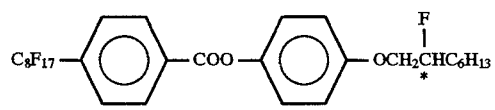

However, the liquid crystal composition (6) caused precipitation of an insoluble component at room temperature, thus showing a poor mutual solubility.

EXAMPLE 3

Liquid crystal cells were prepared in the same manner as in Examples 1 and 2 except that the polyimide alignment film was changed to a polyimide film having a recurring unit (P1) below or a recurring unit (P2) below and the liquid crystal compositions (1)–(4) used in Examples 1 and 2 were used.

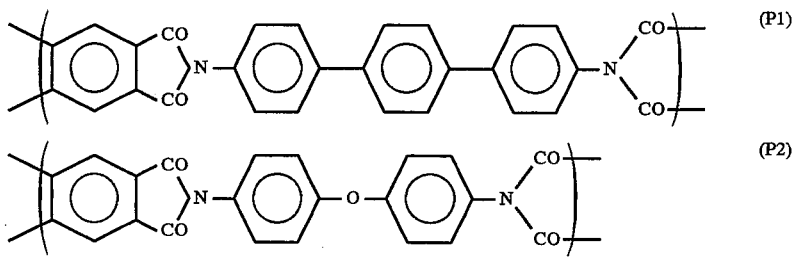

All of the resultant liquid crystal cells (devices) using the polyimide film having the recurring unit (P1) or (P2) showed a very good alignment state over the entire cell similarly as in the case of polyimide films used in Examples 1 and 2.

EXAMPLE 4

Two liquid crystal compositions (7) and (8) were prepared by mixing the following compounds (A, $B_1$, $B_2$ and $B_3$ are identical to those used in Example 1) in the indicated proportions, respectively. (composition) (components) (mixing ratio by wt. %)

(7) A/$B_1$/$B_2$/$B_3$/$C_2$  80/3/3/4/10

(8) A/$B_1$/$B_2$/$B_3$/$C_2$  50/15/10/15/10

$C_2$ (chiral dopant)

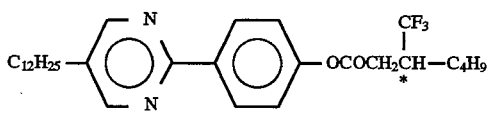

Two liquid crystal devices were prepared and evaluated in respects of the layer inclination angle δ and the contrast ratio in the same manner as in Example 1 by using the liquid crystal compositions (7) and (8), respectively.

The results are shown below.

| Composition | Contrast | δ (deg.) |
| --- | --- | --- |
| (7) | 54 | 3 |
| (8) | 39 | — |

EXAMPLE 5

Two liquid crystal compositions (9) and (10) were prepared in the same manner as in the case of the liquid crystal composition (7) used in Example 4 except that the chiral dopant $C_2$ was changed to optically active compounds (as a chiral dopant) (Ex. Comp. Nos. 4–7 and 4–37), respectively.

The liquid crystal compositions (9) and (10) were subjected to measurement of a contrast ratio in the same manner as in Example 4.

As a result, the liquid crystal composition (9) provided a contrast ratio of 47 and the liquid crystal composition (10) provided a contrast ratio of 41.

EXAMPLE 6

Liquid crystal cells were prepared in the same manner as in Examples 4 and 5 except that the polyimide alignment film was changed to a polyimide film having a recurring unit (P1) below or a recurring unit (P2) below and the liquid crystal compositions (7)–(10) used in Examples 4 and 5 were used.

All of the resultant liquid crystal cells (devices) using the polyimide film having the recurring unit (P1) or (P2) showed a very good alignment state over the entire cell similarly as in the case of polyimide films used in Example 4 and 5.

REFERENCE EXAMPLE 3

A liquid crystal composition (11) was prepared and evaluated in respect of the contrast ratio in the same manner as in the case of the liquid crystal composition (7) used in Example 4 except that the chiral dopant $C_2$ was changed to the following chiral dopant.

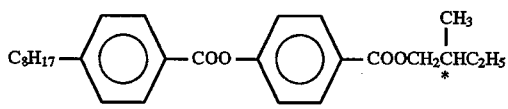

The liquid crystal composition (11) provided a poor contrast ratio of 6.2.

REFERENCE EXAMPLE 4

A liquid crystal composition (12) was prepared in the same manner as in the case of the liquid crystal composition (7) used in Example 4 except that the chiral dopant $C_2$ was changed to the following chiral dopant.

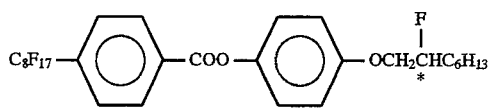

However, the liquid crystal composition (12) caused precipitation of an insoluble component at room temperature, thus showing a poor mutual solubility.

EXAMPLE 7

Two liquid crystal compositions (13) and (14) were prepared by mixing the following compounds (A, $B_1$, $B_2$ and $B_3$ are identical to those used in Example 1) in the indicated proportions, respectively.

(composition) (components) (mixing ratio by wt. %)

(13) A/$B_1$/$B_2$/$B_3$/$C_3$  80/3/3/4/10

(14) A/$B_1$/$B_2$/$B_3$/$C_3$  50/15/10/15/10

$C_3$ (chiral dopant)

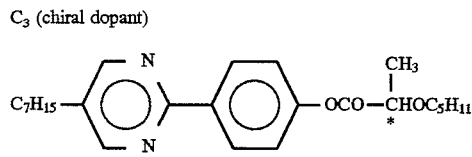

Two liquid crystal devices were prepared and evaluated in respects of the layer inclination angle δ and the contrast ratio in the same manner as in Example 1 by using the liquid crystal compositions (13) and (14), respectively.

The results are shown below.

| Composition | Contrast | δ (deg.) |
|---|---|---|
| (13) | 65 | 3 |
| (14) | 45 | — |

EXAMPLE 8

Two liquid crystal compositions (15) and (16) were prepared in the same manner as in the case of the liquid crystal composition (13) used in Example 7 except that the chiral dopant $C_3$ was changed to optically active compounds (as a chiral dopant) (Ex. Comp. Nos. 5–9 and 5–12), respectively.

The liquid crystal compositions (15) and (16) were subjected to measurement of a contrast ratio in the same manner as in Example 7.

As a result, the liquid crystal composition (15) provided a contrast ratio of 39 and the liquid crystal composition (16) provided a contrast ratio of 43.

EXAMPLE 9

Liquid crystal cells were prepared in the same manner as in Examples 7 and 8 except that the polyimide alignment film was changed to a polyimide film having a recurring unit (P1) below or a recurring unit (P2) below and the liquid crystal compositions (13)–(16) used in Examples 7 and 8 were used.

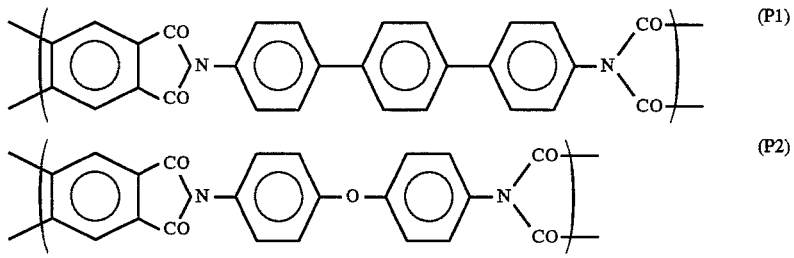

All of the resultant liquid crystal cells (devices) using the polyimide film having the recurring unit (P1) or (P2) showed a very good alignment state over the entire cell similarly as in the case of polyimide films used in Examples 7 and 8.

REFERENCE EXAMPLE 5

A liquid crystal composition (17) was prepared and evaluated in respect of the contrast ratio in the same manner as in the case of the liquid crystal composition (14) used in Example 7 except that the chiral dopant $C_3$ was changed to the following chiral dopant.

The liquid crystal composition (17) provided a poor contrast ratio of 6.2.

EXAMPLE 10

Two liquid crystal compositions (18), (19) and (20) were prepared by mixing the following compounds (A, $B_1$, $B_2$ and $B_3$ are identical to those used in Example 1) in the indicated proportions, respectively.

A/$B_1$/$B_2$/$B_3$/$C_4$  50/15/10/15/10 (wt. %)

$C_4$ (chiral dopant)

6-15 (for Comp. (18)):

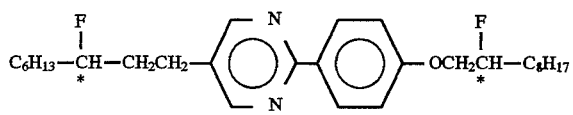

6-19 (for Comp. (19)):

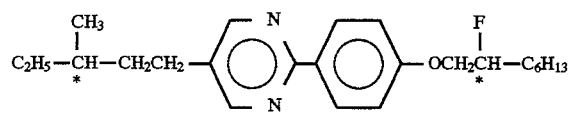

-continued 6-36 (Comp. (20)):

$$\text{C}_6\text{H}_{13}-\overset{\text{F}}{\underset{*}{\text{CH}}}-\text{CH}_2\text{O}-\bigodot-\underset{\text{S}}{\overset{\text{N}}{\bigcirc}}-\text{CH}_2\text{O}-\overset{\text{CF}_3}{\underset{*}{\text{CH}}}-\text{C}_6\text{H}_{13}$$

Two liquid crystal devices were prepared and evaluated in the same manner as in Example 1 by using the liquid crystal compositions (18), (19) and (20), respectively.

The results are shown in Table 6 below.

TABLE 6

| Composition No. | Chiral dopant | θa (degrees) | Contrast | (at 40° C.) Threshold value (μsec) |
|---|---|---|---|---|
| (18) | 6-15 | 24.4 | 43 | 14 |
| (19) | 6-19 | 19.0 | 47 | 97 |
| (20) | 6-36 | 17.2 | 41 | 8 |

EXAMPLE 11

A liquid crystal composition (21) was prepared in the same manner as in the case of the liquid crystal composition (18) used in Example 10 except that the respective components were mixed in the following proportions.

Composition (21):

A/$B_1$/$B_2$/$B_3$/$C_4$ (Ex. Comp. No. 6–15)=80/3/3/4/10 (wt. %)

The liquid crystal composition was evaluated in the same manner as in Example 1 except for further measuring a layer inclination angle δ.

The results are shown below.

θa: 21.6 degrees,

Threshold value: 10 μsec,

Contrast: 58, and

δ=3 degrees.

EXAMPLE 12

Liquid crystal cells were prepared in the same manner as in Examples 10 and 11 except that the polyimide alignment film was changed to a polyimide film having a recurring unit (P1) below or a recurring unit (P2) below and the liquid crystal compositions (18)–(21) used in Examples 10 and 11 were used.

(P1)

(P2)

All of the resultant liquid crystal cells (devices) using the polyimide film having the recurring unit (P1) or (P2) showed a very good alignment state over the entire cell similarly as in the case of polyimide films used in Examples 10 and 11.

REFERENCE EXAMPLE 6

Liquid crystal compositions were prepared by mixing the following compounds in the indicated proportions.

A/$B_1$/$B_2$/$B_3$/Chiral=25/23/20/22/10 (wt. %)

In the above, A, $B_1$, $B_2$ and $B_3$ are identical to those used in Example 1 and "Chiral" is each of the respective chirl dopants used in Examples 1–12.

When the thus-prepared liquid crystal compositions were subjected to measurement of a contrast ratio in the same manner as in Example 1, all of the liquid crystal compositions provided a contrast ratio below 10.

As described above, according to the invention, there is provided a liquid crystal composition, particularly a chiral smectic liquid crystal composition, showing a high mutual solubility of components thereof, providing a liquid crystal molecular layer having a bookshelf structure or a structure closer thereto having a small layer inclination angle, and exhibiting a good alignment state of the liquid crystal layer. As a result, a (chiral smectic or ferroelectric) liquid crystal device using the liquid crystal composition according to the present invention provides various improved properties such as a high responsiveness, a high contrast ratio, a high definition, a high brightness and a large picture area.

In addition, when the liquid crystal device is used as a display device in combination with a light source, drive circuit, etc., a liquid crystal apparatus, such as a liquid crystal display apparatus, providing good display characteristics can be realized.

What is claimed is:

1. A liquid crystal composition comprising:

at least one fluorine-containing mesomorphic compound (a) having smectic phase or having latent smectic phase and represented by the following formula (I):

$$A_1 \!-\!\! \left(\!B_1\!\right)_{\!a}\!\!\underset{X_l}{\overset{|}{M_1}}\!\!\left(\!D_1\!\right)_{\!b}\!\!\underset{Y_m}{\overset{|}{N_1}}\!\!\left(\!F_1\!\right)_{\!c}\!\!\underset{Z_n}{\overset{|}{G_1}}\!-\!R, \qquad (I)$$

in which $B_1$, $D_1$ and $F_1$ independently denote

-continued

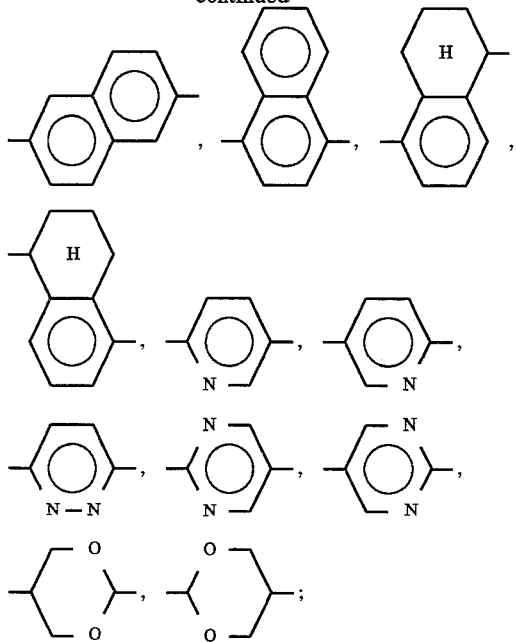

a, b and c independently denote an integer of 0–3 with the proviso that a+b+c is at least 2;

$M_1$ and $N_1$ independently denote —COO—, —OCO—, —COS—, —SCO—, —COSe—, —SeCO—, —COTe—, —TeCO—, —(CH$_2$CH$_2$)$_d$— wherein d is an integer of 1–4, —CH=CH—, —CH=N—, —N=CH—, —CH$_2$O—, —OCH$_2$—, —CO—, —O— or a single bond;

X, Y and Z independently denote —H, —Cl, —F, —Br, —I, —OH, —OCH$_3$, —CN, or —NO$_2$; and l, m and n independently denote an integer of 0–4;

$G_1$ is —COO—C$_e$H$_{2e}$—, —O—C$_e$H$_{2e}$—, —C$_e$H$_{2e}$—, —OSOO—, —OOSO—, —SOO—, —SOOC$_e$H$_{2e}$—, —OC$_e$H$_{2e}$—OC$_{e'}$H$_{2e'}$—, —C$_e$H$_{2e}$—N(C$_p$H$_{2p+1}$)—SO$_2$— or —C$_e$H$_{2e}$—N(C$_p$H$_{2p+1}$)—CO— wherein e and e' independently denote an integer of 1–20 and p is an integer of 0–4;

$A_1$ is a linear or branched group represented by —O—C$_f$H$_{2f}$—O—C$_g$H$_{2g+1}$, —C$_f$H$_{2f}$—O—C$_g$H$_{2g+1}$, —C$_f$H$_{2f}$—R', —O—C$_f$H$_{2f}$—R', —COO—C$_f$H$_{2f}$—R' or —OCO—C$_f$H$_{2f}$—R' wherein R' is —Cl, —F, —CF$_3$, —NO$_2$, —CN, —H, —COO—C$_f$H$_{2f+1}$ or —OCO—C$_f$H$_{2f+1}$ in which f, f' and g independently denote an integer of 1–20; and R is -(C$_{x'}$F$_{2x'}$O)$_z$-C$_y$F$_{2y+1}$ wherein x' is independently an integer of 1–10 for each C$_{x'}$F$_{2x'}$O group, y is an integer of 1–10, and z' is an integer of 1–6; and at least one optically active compound (b) represented by the following formula (II):

  (II), wherein $A_0$ is a mesogen group consisting one to four divalent groups each connected by a single bond, —COO—, —OCO—, —CH$_2$O—, or —OCH$_2$— and each capable of having one or two substituents selected from the group consisting of F, Cl, Br, CH$_3$, CF$_3$ and CN, the divalent group being selected from the group consisting of 1,4-phenylene; pyridine-2-,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; and 2-alkylcoumaran-2,5-diyl having a linear or branched alkyl group having 1–18 carbon atoms; and $R_0$ and $R_1$ independently denote a linear or branched alkyl group having 1–18 carbon atoms; each of the alkyl groups $R_0$ and $R_1$ being capable of including at least one —CH$_2$— group which can be replaced by —Y—, —Y—CO—, —CO—Y—, —CO—, —OCOO—, —CH=CH— or —C≡C— in which Y is O or S; and at least one of $R_0$ and $R_1$ having at least one asymmetric carbon atom directly connected with F, CF$_3$ or CH$_3$, $R_0$ and $R_1$ satisfying any one of the following conditions (i) to (iv):

(i) any one of $R_0$ and $R_1$ is represented by the following formula:

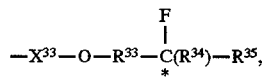

in which $R^{35}$ is a linear or branched alkyl group having 1–18 carbon atoms; $R^{33}$ is —CH$_2$— or —CO—; $R^{34}$ is H or CH$_3$; $X^{33}$ is a single bond or —CH$_2$— when $R^{33}$ is —CO—, or $X^{33}$ is a single bond, —CO— or —CH$_2$— when $R^{33}$ is —CH$_2$—; and C* is an asymmetric carbon atom;

(ii) any one of $R_0$ and $R_1$ is represented by the following formula:

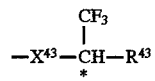

in which $R^{43}$ is a linear or branched alkyl group having 1–10 carbon atoms; $R^{43}$ is —O—, —COO—, —OCH$_2$—, —OCH$_2$CH$_2$—, —OCOCH$_2$, —CH$_2$O—, —COOCH$_2$CH$_2$—, —CH$_2$OCH$_2$CH$_2$— or —CH$_2$COOCH$_2$—; and C* is an asymmetric carbon atom;

(iii) any one of $R_0$ and $R_1$ is represented by the following formula:

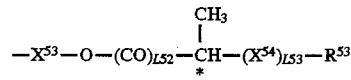

in which $R^{53}$ is a linear or branched alkyl group having 1–18 carbon atoms; L52 is 0 or 1; $X^{53}$ is a single bond, —CO— or —C$_2$— when L52 is 0, or $X^{53}$ is a single bond or —CH$_2$— when L52 is 1; $X^{54}$ is —COO— or —O—; L53 is 0 or 1; and C* is an asymmetric carbon atom; and (iv) both of $R_0$ and $R_1$ are an alkyl group having an asymmetric carbon atom directly connected with F, CF$_3$ or CH$_3$.

2. A composition according to claim 1, wherein the compound (a) of the formula (I) is a fluorine-containing mesomorphic compound represented by the following formula (I'):

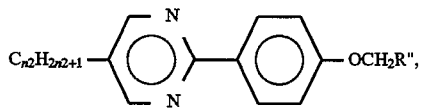

in which n2 is an integer of 5–10; and

R" is (—$C_{x''}F_{2x''}O)_{z''}C_{y'}F_{2y'+1}$ wherein, x" is independently an integer of 1–3 for each $C_{x''}F_{2x''}O$ group y' is an integer of 1–4, and z" is an integer of 1—3.

3. A composition according to claim 1, which comprises at least 30 wt. % of a fluorine-containing mesomorphic compound (a).

4. A composition according to claim 1, which comprises at least 50 wt. % of a fluorine-containing mesomorphic compound (a).

5. A composition according to claim 1, wherein the compound (b) of the formula (II) is an optically active compound represented by the following formula (III):

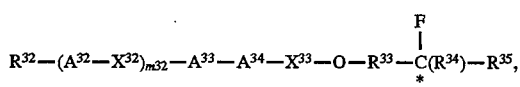

in which $R^{32}$ is a linear or branched alkyl group having 1–18 carbon atoms capable of including at least one —$CH_2$— group which can be replaced by —$Y^3$—, —$Y^3$—CO—, —CO—$Y^3$—, —CO—, —OCOO—, —CH=CH— or —C≡C— wherein $Y^3$ is O or S;

$R^{35}$ is a linear or branched alkyl group having 1–18 carbon atoms;

m32 is 0, 1 or 2;

$R^{33}$ is —$CH_2$— or —CO—;

$R^{34}$ is H or $CH_3$;

$A^{32}$, $A^{33}$ and $A^{34}$ independently denote a single bond, 1,4-phenylene; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$X^{32}$ is a single bond, —COO—, —OCO—, —$CH_2$O— or —$OCH_2$—;

$X^{33}$ is a single bond or —$CH_2$— when $R^{33}$ is —CO—, Or $X^{33}$ is a single bond, —CO— or —$CH_2$— when $R^{33}$ is —$CH_2$—;

C* is an asymmetric carbon atom; and $A^{32}$, $A^{33}$ and $A^{34}$ each can have one or two substituents selected from the group consisting of F, Cl, Br, $CH_3$, $CF_3$ and CN and cannot be single bond at the same time.

6. A composition according to claim 5, wherein $R^{32}$ and $R^{35}$ independently denote a linear or branched alkyl group;

m32 is 0; $R^{33}$ is —$CH_2$— or —CO—; $R^{34}$ is H or $CH_3$; $A^{33}$ is

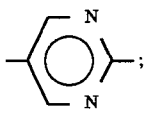

$A^{34}$ is

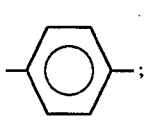

and $X^{33}$ is a single bond or —$CH_2$— when $R^{33}$ is —CO—, or $X^{33}$ is a single bond, —CO— or —$CH_2$— when $R^{33}$ is —$CH_2$—.

7. A composition according to claim 5, which comprises below 50 wt. % of an optically active compound of the formula (III).

8. A composition according to claim 1, wherein the compound (b) of the formula (II) is an optically active compound represented by the following formula (IV):

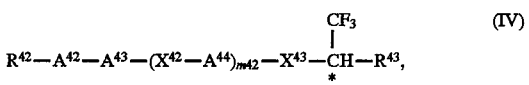

in which $R^{42}$ is a linear or branched alkyl group having 1–18 carbon atoms capable of including at least one —$CH_2$— group which can be replaced by —$Y^4$—, —$Y^4$—CO—, —CO—$Y^4$—, —CO—, —OCOO—, —CH=CH— or —C≡C— wherein $Y^4$ is O or S;

$R^{43}$ is a linear or branched alkyl group having 1–10 carbon atoms;

m42 is 0, 1 or 2;

$A^{42}$, $A^{43}$ and $A^{44}$ independently denote a single bond, 1,4-phenylene; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$X^{42}$ is a single bond, —COO—, —OCO—, —$CH_2$O— or —$OCH_2$—;

$X^{43}$ is —O—, —COO—, —$OCH_2$—, —$OCH_2CH_2$—, —$OCOCH_2$—, —$CH_2$O—, —$COOCH_2CH_2$—, —$CH_2OCH_2CH_2$— or —$CH_2COOCH_2$;

C* is an asymmetric carbon atom; and $A^{42}$, $A^{43}$ and $A^{44}$ each can have one or two substituents selected from the group consisting of F, Cl, Br, $CH_3$, $CF_3$ and CN and cannot be a single bond at the same time.

9. A composition according to claim 8, wherein $R^{42}$ is a linear or branched alkyl or alkoxy group having 1–18 carbon atoms; $R^{43}$ is a linear or branched alkyl group having 1–10 carbon atoms; M42 is 0; $R^{42}$ is

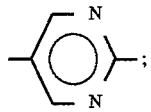

$A^{43}$ is

and $X^{43}$ is —O—, —OCH$_2$—, —COO—, —COOCH$_2$CH$_2$— or —OCH$_2$CH$_2$—.

10. A composition according to claim 8, which comprises below 50 wt. % of an optically active compound of the formula (IV).

11. A composition according to claim 1, wherein the compound (b) of the formula (II) is an optically active compound represented by the following formula (V):

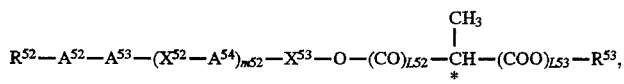

in which $R_{52}$ is a linear or branched alkyl group having 1–18 carbon atoms capable of including at least one —CH$_2$— group which can be replaced by —Y$^5$—, —Y$^5$—CO—, —CO—Y$^5$—, —CO—, —OCOO—, —CH=CH— or —C≡C— wherein Y$^5$ is O or S;

$R^{53}$ is a linear or branched alkyl or alkoxy group having 1–10 carbon atoms;

M52 is 0, 1 or 2;

$A^{52}$, $A^{53}$ $A^{54}$ independently denote a single bond, 1,4-phenylene; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$X^{52}$ is a single bond, —COO—, —OCO—, —CH$_2$O— or —OCH$_2$—;

$X^{53}$ is a single bond, —CO— or —CH$_2$— when L52 is 0 or $X^{53}$ is a single bond or —CH$_2$— when L52 is 1;

L52 and L53 are 0 or 1;

C* is an asymmetric carbon atom; and $A^{52}$, $A^{53}$ and $A^{54}$ each can have one or two substituents selected from the group consisting of F, Cl, Br, CH$_3$, CF$_3$ and CN and cannot be a single bond at the same time.

12. A composition according to claim 11, wherein $R^{52}$ is a linear or branched alkyl or alkoxy group having 1–18 carbon atoms; $R^{53}$ is a linear or branched alkyl group having 1–10 carbon atoms; m52 and L52 are 0; $A^{52}$ is

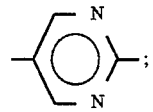

$A^{53}$ is

and $X^{53}$ is a single bond or —CO—.

13. A composition according to claim 4, which comprises below 50 wt. % of an optically active compound of the formula (V).

14. A composition according to claim 1, wherein the compound (b) of the formula (II) is an optically active compound represented by the following formula (VI):

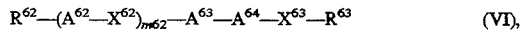

in which $R^{62}$ and $R^{63}$ independently denote a linear or branched alkyl group having 1–18 carbon atoms and at least one asymmetric carbon atom directly connected with F, CF$_3$ or CH$_3$ and capable of including at least one —CH$_2$— group which can be replaced by —Y$^6$—, —Y$^6$—CO—, —CO—Y$^6$—, —CO—, —OCOO—, —CH=CH— or —C≡C— wherein Y$^6$ is O or S;

m62 is 0, 1 or 2;

$A^{62}$, $A^{63}$ and $A^{64}$ independently denote a single bond, 1,4-phenylene; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms; and $X^{62}$ and $X^{63}$ independently denote a single bond, —COO—, —OCO—, —CH$_2$O— or —OCH$_2$; and $A^{62}$, $A^{63}$ and $A^{64}$ each can have one or two substituents selected from the group consisting of F, Cl, Br, CH$_3$, CF$_3$ and CN and cannot be a single bond at the same time.

15. A composition according to claim 14, wherein $R^{63}$ in the formula (VI) is represented by the following formula:

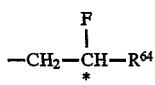

in which $R^{64}$ is a linear or branched alkyl group having 1–16 carbon atoms.

16. A composition according to claim 14, wherein $R^{62}$ in the formula (VI) is represented by the following formula:

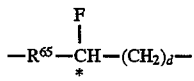

in which $R^{65}$ is a linear or branched alkyl group having 1–16 carbon atoms, and d is an integer of 1–6.

17. A composition according to claim 14, wherein m62 is 0; $A^{63}$ is

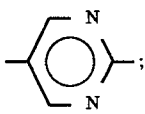

and $A^{64}$ is

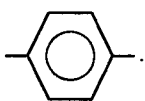

18. A composition according to claim 14, which comprises below 50 wt. % of an optically active compound of the formula (VI).

19. A liquid crystal device, comprising a liquid crystal composition according to any one of claims 1, 2, 3, 4, 5, 18 and 25.

20. A device according to claim 19, comprising a pair of opposite electrode plates and the liquid crystal composition disposed between the electrode plates.

21. A device according to claim 20, which further comprises an alignment control layer formed on at least one of the electrode plates.

22. A device according to claim 21, wherein the alignment control layer comprises a polyimide having a recurring unit represented by the following formula (VII):

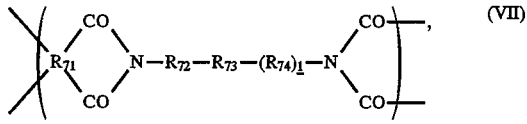

in which $R_{71}$ is

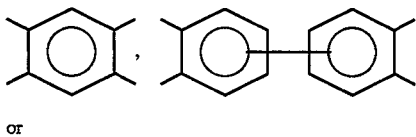

or

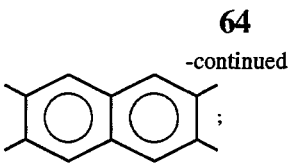

$R_{72}$ and $R_{74}$ independently denote

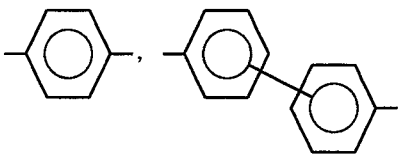

or

$R_{73}$ is a single bond or —O—; and l is 0, 1 or 2.

23. A display method, comprising:

providing a liquid crystal composition according to claim 1; and controlling the alignment direction of liquid crystal molecules in accordance with image data to effect display.

24. A liquid crystal apparatus comprising a liquid crystal device according to claim 19.

25. A composition according to claim 1, further comprising at least one fluorine-containing mesomorphic compound having smectic phase or having latent smectic phase and represented by the following formula (I"):

$$A_1 \mathrm{+B_1 \mathit{\frac{}{a}} M_1 + D_1 \mathit{\frac{}{b}} N_1 + F_1 \mathit{\frac{}{c}} G_1 \mathit{+} R'} \qquad (I'')$$
$$\phantom{A_1+B_1}Xl \phantom{M_1+}Ym \phantom{N_1+}Zn$$

in which $B_1$, $D_1$ and $F_1$ independently denote

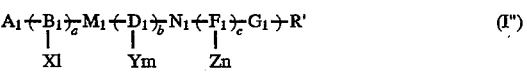

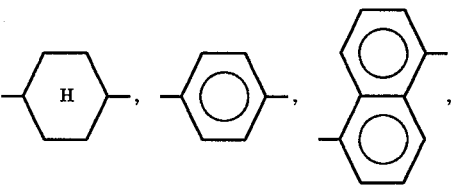

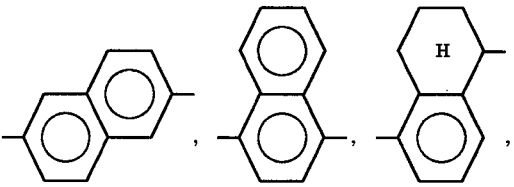

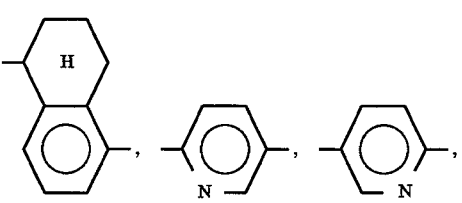

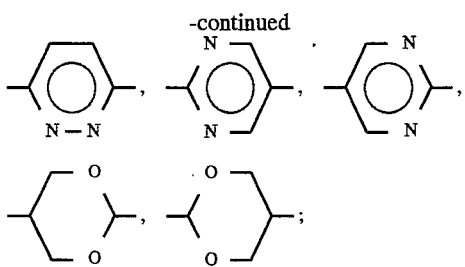

a, b and c independently denote an integer of 0–3 with the proviso that a+b+c is at least 2;

$M_1$ and $N_1$ independently denote —COO—, —OCO—, —COS—, —SCO—, —COSe—, —SeCO—, —COTe—, —TeCO—, —(CH$_2$CH$_2$)$_d$— wherein d is an integer of 1–4, —CH=CH—, —CH=N—, —N=CH—, —CH$_2$O—, —OCH$_2$—, —CO—, —O— or a single bond;

X, Y and Z independently denote —H, —Cl, —F, —Br, —I, —OH, —OCH$_3$, —CN, or —NO$_2$; and l, m and n independently denote an integer of 0–4;

$G_1$ is —COO—C$_e$H$_{2e}$—, —O—C$_e$H$_{2e}$—, —C$_e$H$_{2e}$—, —OSOO—, —OOSO—, —SOO—, —SOOC$_e$H$_{2e}$—, —OC$_e$H$_{2e}$—OC$_{e'}$H$_{2e'}$—, —C$_e$H$_{2e}$—N(C$_p$H$_{2p+1}$)—SO$_2$— or —C$_e$H$_{2e}$—N(C$_p$H$_{2p+1}$)—CO— wherein e and e' independently denote an integer of 1–20 and p is an integer of 0–4;

$A_1$ is a linear or branched group represented by —O—C$_f$H$_{2f}$—O—C$_g$H$_{2g+1}$, —C$_f$H$_{2f}$—O—C$_g$H$_{2g+1}$, —C$_f$H$_{2f}$—R', —O—C$_f$H$_{2f}$—R', —COO—C$_f$H$_{2f}$—R' or —OCO—C$_f$H$_{2f}$—R' wherein R' is —Cl, —F, —CF$_3$, —NO$_2$, —CN, —H, —COO—C$_f$H$_{2f+1}$ or —OCO—C$_f$H$_{2f+1}$ in which f, f' and g independently denote an integer of 1–20; and R' is —C$_x$F$_{2x+1}$ wherein x is an integer of 1–20.

* * * * *

UNITED STATES PATENT AND TRADEMARK OFFICE
CERTIFICATE OF CORRECTION

PATENT NO. : 5,641,427

DATED : June 24, 1997

INVENTOR(S) : KENJI SHINJO, ET AL.                    Page 1 of 6

It is certified that error appears in the above-identified patent and that said Letters Patent is hereby corrected as shown below:

<u>ON THE TITLE PAGE</u>

<u>AT [56] REFERENCES CITED, FOREIGN PATENTS DOCUMENTS</u>

| | | |
|---|---|---|
| "01022990" | should read -- | 1-022990 --. |
| 01031740 | | 1-031740 |
| 01038077 | | 1-038077 |
| 01121244 | | 1-121244 |
| 01160986 | | 1-160986 |
| 01207280 | | 1-207280 |
| 01242543 | | 1-242543 |
| 01265052 | | 1-265052 |
| 01272571 | | 1-272571 |
| 02000127 | | 2-000127 |
| 02000227 | | 2-000227 |
| 02028158 | | 2-028158 |
| 02069427 | | 2-069427 |
| 02069440 | | 2-069440 |
| 02069467 | | 2-069467 |
| 02115145 | | 2-115145 |
| 02295943 | | 2-295943 |
| 03043488 | | 3-043488 |
| 03058980 | | 3-058980 |
| 03083971 | | 3-083971 |
| 03193774 | | 3-193774 |
| 03223232 | | 3-223232 |
| 03227980 | | 3-227980 |
| 03236353 | | 3-236353 |
| 04013797 | | 4-013797 |
| 04253789 | | 4-253789 |
| 04264052 | | 4-264052 |
| 04300871 | | 4-300871 |
| 06234749 | | 6-234749 |

UNITED STATES PATENT AND TRADEMARK OFFICE
CERTIFICATE OF CORRECTION

PATENT NO. : 5,641,427

DATED : June 24, 1997

INVENTOR(S) : KENJI SHINJO, ET AL.

It is certified that error appears in the above-identified patent and that said Letters Patent is hereby corrected as shown below:

AT [54] TITLE

"COMPOSITION LIQUID" should read
--COMPOSITION, LIQUID--.

COLUMN 1

Line 3, "COMPOSITION LIQUID" should read
--COMPOSITION, LIQUID--;
Line 20, "outputs" should read --outputting--; and
Line 36, "using use" should read --using--.

COLUMN 2

Line 36, "of methods" should read --of the methods--; and
Line 54, "just discovered" should read
--just been discovered--.

COLUMN 3

Line 4, "other" should read --many--;
Line 5, "many" should read --other--;
Line 14, "exhibit" should read --exhibiting--; and
Line 16, "comprise" should read --comprising--.

COLUMN 4

Line 3, "atom;" should read --atoms;--; and
Line 10, "1-18;" should read --1-18 carbon atoms;--.

COLUMN 5

Line 2, "to a" should read --to as a--.

UNITED STATES PATENT AND TRADEMARK OFFICE
CERTIFICATE OF CORRECTION

PATENT NO. : 5,641,427

DATED : June 24, 1997

INVENTOR(S) : KENJI SHINJO, ET AL.

It is certified that error appears in the above-identified patent and that said Letters Patent is hereby corrected as shown below:

COLUMN 6

Line 52, "and" (first occurrence) should be deleted; and
Line 54, "$-(C_x \cdot F_{2x'})_{z'} C_y F_{2y+1}$" should read
-- $-(C_x \cdot F_{2x'} \cdot O)_{z'} C_y F_{2y+1}$ --.

COLUMN 17

Line 67, "In case" should read --In the case--.

COLUMN 18

Line 34, "Of" should read --of--; and
Line 67, "atom" should read --atom;--.

COLUMN 19

Line 9, "$-CH_2OCH_2CH_2$" should read -- $-CH_2OCH_2CH_2-$ --; and
Line 62, "atom;" should read --atoms;--.

COLUMN 25

Line 21, "is;" should read --is--;
Line 37, "$-C_2-$ when" should read
-- $-CH_2-$ when $R^{33}$ is $-CH_2-$ --; and
Line 40, "de" should read --due--.

COLUMN 26

Line 22, "atom;" should read --atoms;--.

COLUMN 29

Line 42, "is;" should read --is--.

UNITED STATES PATENT AND TRADEMARK OFFICE
CERTIFICATE OF CORRECTION

PATENT NO. : 5,641,427

DATED : June 24, 1997

INVENTOR(S) : KENJI SHINJO, ET AL.

It is certified that error appears in the above-identified patent and that said Letters Patent is hereby corrected as shown below:

COLUMN 30

Line 66, "atom;" should read --atoms;"--.

COLUMN 31

Line 10, "C," should read --C*--.

COLUMN 35

Line 32, "by wherein" should read
        --by $-Y^6-$, $-Y^6-CO-$, $-CO-Y^6$, $-CO-$, $-OCOO-$,
        $-CH=CH-$ or $-C\equiv C-$ wherein--; and
    Line 47, "atom;" should read --atoms--.

COLUMN 40

Line 33, "spaces" should read --species--; and
    Line 56, "Deutschev" should read --Deutscher--.

COLUMN 41

Line 19, "in case" should read --in the case--; and
    Line 55, "an" should read --a--.

COLUMN 45

Line 43, "polarizer" should read --polarizers--; and
    Line 44, "polarizer" should read --polarizers--.

COLUMN 46

Line 56, "(°C.)))" should read --(°C.))--.

UNITED STATES PATENT AND TRADEMARK OFFICE
CERTIFICATE OF CORRECTION

PATENT NO. : 5,641,427

DATED : June 24, 1997

INVENTOR(S) : KENJI SHINJO, ET AL.

It is certified that error appears in the above-identified patent and that said Letters Patent is hereby corrected as shown below:

COLUMN 49

Line 44, "An" should read -- "A" --.

COLUMN 50

Line 15, "1=1 80/" should read --1=80/--.

COLUMN 56

Line 7, "chirl" should read --chiral--.

COLUMN 57

Line 59, "consisting" should read --consisting of--.

COLUMN 58

Line 7, "atom;" should read --atoms;--;
Line 17, "—≡CC—" should read -- —C≡C— --; and
Line 59, "-$C_2$-" should read -- -$CH_2$- --.

COLUMN 59

Line 12, "group y'" should read --group, y'--;
Line 49, "atom;" should read --atoms;--; and
Line 57, "Or" should read --or--.

COLUMN 60

Line 49, "atom;" should read --atoms;--.

UNITED STATES PATENT AND TRADEMARK OFFICE
CERTIFICATE OF CORRECTION

PATENT NO. : 5,641,427

DATED : June 24, 1997

INVENTOR(S) : KENJI SHINJO, ET AL.

It is certified that error appears in the above-identified patent and that said Letters Patent is hereby corrected as shown below:

COLUMN 61

Line 2, "M42" should read --m42-- and "$R^{42}$" should read --$A^{42}$--;
Line 31, "$R_{52}$" should read --$R^{52}$--;
Line 38, "M52" should read --m52--; and
Line 49, "atom;" should read --atoms;--.

COLUMN 62

Line 17, "claim 4," should read --claim 11,--; and
Line 52, "atom;" should read --atoms;--.

COLUMN 63

Line 39, "claims 1, 2, 3, 4, 5, 18" should read --claims 1-18--.

Signed and Sealed this

Twenty-first Day of July, 1998

Attest:

BRUCE LEHMAN

Attesting Officer

Commissioner of Patents and Trademarks